United States Patent
Maes

(10) Patent No.: US 9,674,180 B2
(45) Date of Patent: *Jun. 6, 2017

(54) USING IDENTITY/RESOURCE PROFILE AND DIRECTORY ENABLERS TO SUPPORT IDENTITY MANAGEMENT

(71) Applicant: ORACLE INTERNATIONAL CORPORATION, Redwood Shores, CA (US)

(72) Inventor: Stephane H. Maes, Fremont, CA (US)

(73) Assignee: ORACLE INTERNATIONAL CORPORATION, Redwood Shores, CA (US)

(*) Notice: Subject to any disclaimer, the term of this patent is extended or adjusted under 35 U.S.C. 154(b) by 782 days.

This patent is subject to a terminal disclaimer.

(21) Appl. No.: 14/081,578

(22) Filed: Nov. 15, 2013

(65) Prior Publication Data

US 2014/0075531 A1  Mar. 13, 2014

Related U.S. Application Data

(62) Division of application No. 11/330,963, filed on Jan. 11, 2006, now Pat. No. 8,688,813.

(51) Int. Cl.
*H04L 29/06* (2006.01)
*H04L 29/12* (2006.01)
*H04L 29/08* (2006.01)

(52) U.S. Cl.
CPC .... *H04L 63/0853* (2013.01); *H04L 29/12047* (2013.01); *H04L 61/15* (2013.01); *H04L 63/0807* (2013.01); *H04L 67/20* (2013.01)

(58) Field of Classification Search
None
See application file for complete search history.

(56) References Cited

U.S. PATENT DOCUMENTS

| | | | |
|---|---|---|---|
| 4,484,306 A | 11/1984 | Kulczycky et al. |
| 4,956,769 A | 9/1990 | Smith |
| 4,961,224 A | 10/1990 | Yung |
| 5,077,666 A | 12/1991 | Brimm et al. |
| 5,113,499 A | 5/1992 | Ankney et al. |
| 5,226,143 A | 7/1993 | Baird et al. |
| 5,428,795 A | 6/1995 | Johnson et al. |

(Continued)

OTHER PUBLICATIONS

Clear Trust, Unified Access Management, Securant Technologies, Inc., 1997, pp. 1-23.

(Continued)

*Primary Examiner* — David Le
(74) *Attorney, Agent, or Firm* — Kilpatrick Townsend & Stockton LLP

(57) ABSTRACT

Embodiments of the present invention provide methods, system and machine-readable media for dynamically providing identity management or other services. According to one embodiment, dynamically providing services can comprise receiving a request related to an unknown principal. A service to which the principal is known can be selected. Once a service to which the principal is known has been located, an identity management result can be obtained from the selected service. The method can further comprise determining based on the identity management result whether the principal is authorized to access a requested resource. In response to determining the principal is authorized, the requested resource can be accessed.

23 Claims, 9 Drawing Sheets

(56) References Cited

U.S. PATENT DOCUMENTS

| | | |
|---|---|---|
| 5,455,953 A | 10/1995 | Russell |
| 5,530,861 A | 6/1996 | Diamant et al. |
| 5,557,742 A | 9/1996 | Smaha et al. |
| 5,581,691 A | 12/1996 | Hsu et al. |
| 5,678,041 A | 10/1997 | Baker et al. |
| 5,689,679 A | 11/1997 | Jouppi |
| 5,692,125 A | 11/1997 | Schloss et al. |
| 5,708,780 A | 1/1998 | Levergood et al. |
| 5,757,920 A | 5/1998 | Misra et al. |
| 5,764,890 A | 6/1998 | Glasser et al. |
| 5,765,153 A | 6/1998 | Benantar et al. |
| 5,793,966 A | 8/1998 | Amstein et al. |
| 5,802,518 A | 9/1998 | Karaev et al. |
| 5,812,776 A | 9/1998 | Gifford |
| 5,819,271 A | 10/1998 | Mahoney et al. |
| 5,826,029 A | 10/1998 | Gore, Jr. et al. |
| 5,842,212 A | 11/1998 | Ballurio et al. |
| 5,872,969 A | 2/1999 | Copeland et al. |
| 5,875,461 A | 2/1999 | Lindholm |
| 5,889,952 A | 3/1999 | Hunnicutt et al. |
| 5,892,903 A | 4/1999 | Klaus |
| 5,893,149 A | 4/1999 | Hagersten et al. |
| 5,903,878 A | 5/1999 | Talati et al. |
| 5,907,621 A | 5/1999 | Bachman et al. |
| 5,908,469 A | 6/1999 | Botz et al. |
| 5,924,096 A | 7/1999 | Draper et al. |
| 5,940,394 A | 8/1999 | Killian |
| 5,944,780 A | 8/1999 | Chase et al. |
| 5,944,824 A | 8/1999 | He |
| 5,978,779 A | 11/1999 | Stein et al. |
| 5,991,771 A | 11/1999 | Falls et al. |
| 5,991,810 A | 11/1999 | Shapiro et al. |
| 5,991,881 A | 11/1999 | Conklin et al. |
| 5,999,911 A | 12/1999 | Berg et al. |
| 6,005,571 A | 12/1999 | Pachauri et al. |
| 6,012,059 A | 1/2000 | Neimat et al. |
| 6,026,474 A | 2/2000 | Carter et al. |
| 6,028,605 A | 2/2000 | Conrad et al. |
| 6,029,195 A | 2/2000 | Herz |
| 6,032,227 A | 2/2000 | Shaheen et al. |
| 6,041,357 A | 3/2000 | Kunzelman et al. |
| 6,058,381 A | 5/2000 | Nelson |
| 6,058,480 A | 5/2000 | Brown |
| 6,061,799 A | 5/2000 | Eldridge et al. |
| 6,064,656 A | 5/2000 | Angal et al. |
| 6,073,109 A | 6/2000 | Flores et al. |
| 6,073,174 A | 6/2000 | Montgomerie et al. |
| 6,081,518 A | 6/2000 | Bowman-Amuah |
| 6,088,679 A | 7/2000 | Barkley |
| 6,088,796 A | 7/2000 | Cianfrocca et al. |
| 6,098,056 A | 8/2000 | Rusnak et al. |
| 6,112,228 A | 8/2000 | Earl et al. |
| 6,119,167 A | 9/2000 | Boyle et al. |
| 6,131,120 A | 10/2000 | Reid |
| 6,133,916 A | 10/2000 | Bukszar et al. |
| 6,134,658 A | 10/2000 | Multerer et al. |
| 6,138,104 A | 10/2000 | Marchak et al. |
| 6,141,778 A | 10/2000 | Kane et al. |
| 6,151,531 A | 11/2000 | Frankel et al. |
| 6,154,741 A | 11/2000 | Feldman |
| 6,157,925 A | 12/2000 | Jenkins et al. |
| 6,157,942 A | 12/2000 | Chu et al. |
| 6,158,010 A | 12/2000 | Moriconi et al. |
| 6,163,844 A | 12/2000 | Duncan et al. |
| 6,170,013 B1 | 1/2001 | Murata |
| 6,178,418 B1 | 1/2001 | Singer |
| 6,182,086 B1 | 1/2001 | Lomet et al. |
| 6,182,142 B1 | 1/2001 | Win et al. |
| 6,185,608 B1 | 2/2001 | Hon et al. |
| 6,185,650 B1 | 2/2001 | Boonie et al. |
| 6,192,476 B1 | 2/2001 | Gong |
| 6,208,986 B1 | 3/2001 | Schneck et al. |
| 6,212,558 B1 | 4/2001 | Antur et al. |
| 6,212,640 B1 | 4/2001 | Abdelnur et al. |
| 6,216,199 B1 | 4/2001 | DeKoning et al. |
| 6,226,752 B1 | 5/2001 | Gupta et al. |
| 6,230,185 B1 | 5/2001 | Salas et al. |
| 6,233,576 B1 | 5/2001 | Lewis |
| 6,233,618 B1 | 5/2001 | Shannon |
| 6,240,360 B1 | 5/2001 | Phelan |
| 6,240,414 B1 | 5/2001 | Beizer et al. |
| 6,243,816 B1 | 6/2001 | Fang et al. |
| 6,253,248 B1 | 6/2001 | Nakai et al. |
| 6,256,739 B1 | 7/2001 | Skopp et al. |
| 6,266,420 B1 | 7/2001 | Langford et al. |
| 6,275,944 B1 | 8/2001 | Kao et al. |
| 6,282,546 B1 | 8/2001 | Gleichauf et al. |
| 6,286,098 B1 | 9/2001 | Wenig et al. |
| 6,289,462 B1 | 9/2001 | McNabb et al. |
| 6,301,668 B1 | 10/2001 | Gleichauf et al. |
| 6,311,269 B2 | 10/2001 | Luckenbaugh et al. |
| 6,314,492 B1 | 11/2001 | Allen et al. |
| 6,321,338 B1 | 11/2001 | Porras et al. |
| 6,324,656 B1 | 11/2001 | Gleichauf et al. |
| 6,338,097 B1 | 1/2002 | Krenzke et al. |
| 6,339,423 B1 | 1/2002 | Sampson et al. |
| 6,345,266 B1 | 2/2002 | Ganguly et al. |
| 6,347,312 B1 | 2/2002 | Byrne et al. |
| 6,347,374 B1 | 2/2002 | Drake et al. |
| 6,357,010 B1 | 3/2002 | Viets et al. |
| 6,366,913 B1 | 4/2002 | Fitler, Jr. et al. |
| 6,374,359 B1 | 4/2002 | Shrader et al. |
| 6,381,579 B1 | 4/2002 | Gervais et al. |
| 6,385,653 B1 | 5/2002 | Sitaraman et al. |
| 6,393,569 B1 | 5/2002 | Orenshteyn |
| 6,415,321 B1 | 7/2002 | Gleichauf et al. |
| 6,421,682 B1 | 7/2002 | Craig et al. |
| 6,421,781 B1 | 7/2002 | Fox et al. |
| 6,430,688 B1 | 8/2002 | Kohl et al. |
| 6,434,531 B1 | 8/2002 | Lancelot et al. |
| 6,442,567 B1 | 8/2002 | Retallick et al. |
| 6,453,342 B1 | 9/2002 | Himmel et al. |
| 6,457,047 B1 | 9/2002 | Chandra et al. |
| 6,460,141 B1 | 10/2002 | Olden |
| 6,463,418 B1 | 10/2002 | Todd |
| 6,463,509 B1 | 10/2002 | Teoman et al. |
| 6,466,932 B1 | 10/2002 | Dennis et al. |
| 6,470,386 B1 | 10/2002 | Combar et al. |
| 6,487,663 B1 | 11/2002 | Jaisimha et al. |
| 6,499,107 B1 | 12/2002 | Gleichauf et al. |
| 6,507,847 B1 | 1/2003 | Fleischman |
| 6,513,056 B1 | 1/2003 | Copeland et al. |
| 6,516,416 B2 | 2/2003 | Gregg et al. |
| 6,519,643 B1 | 2/2003 | Foulkes et al. |
| 6,519,648 B1 | 2/2003 | Eyal |
| 6,526,438 B1 | 2/2003 | Bienvenu et al. |
| 6,526,447 B1 | 2/2003 | Giammaria |
| 6,536,037 B1 | 3/2003 | Guheen et al. |
| 6,539,379 B1 | 3/2003 | Vora et al. |
| 6,539,382 B1 | 3/2003 | Byrne et al. |
| 6,539,396 B1 | 3/2003 | Bowman-amuah |
| 6,542,993 B1 | 4/2003 | Erfani |
| 6,557,039 B1 | 4/2003 | Leong et al. |
| 6,578,147 B1 | 6/2003 | Shanklin et al. |
| 6,584,548 B1 | 6/2003 | Bourne et al. |
| 6,584,569 B2 | 6/2003 | Reshef |
| 6,591,347 B2 | 7/2003 | Tischler et al. |
| 6,598,058 B2 | 7/2003 | Bird et al. |
| 6,609,205 B1 | 8/2003 | Bernhard et al. |
| 6,615,218 B2 | 9/2003 | Mandal et al. |
| 6,618,806 B1 | 9/2003 | Brown et al. |
| 6,629,132 B1 | 9/2003 | Ganguly et al. |
| 6,636,891 B1 | 10/2003 | LeClair et al. |
| 6,640,307 B2 | 10/2003 | Viets et al. |
| 6,647,393 B1 | 11/2003 | Dietterich et al. |
| 6,668,322 B1 | 12/2003 | Wood et al. |
| 6,675,261 B2 | 1/2004 | Shandony |
| 6,678,828 B1 | 1/2004 | Pham et al. |
| 6,680,942 B2 | 1/2004 | Mead et al. |
| 6,691,232 B1 | 2/2004 | Wood et al. |
| 6,697,849 B1 | 2/2004 | Carlson |
| 6,708,170 B1 | 3/2004 | Byrne et al. |
| 6,711,632 B1 | 3/2004 | Chow et al. |
| 6,718,328 B1 | 4/2004 | Norris |

(56) References Cited

U.S. PATENT DOCUMENTS

| | | |
|---|---|---|
| 6,741,992 B1 | 5/2004 | McFadden |
| 6,742,126 B1 | 5/2004 | Mann et al. |
| 6,745,221 B1 | 6/2004 | Ronca |
| 6,748,447 B1 | 6/2004 | Basani et al. |
| 6,754,696 B1 | 6/2004 | Kamath et al. |
| 6,757,708 B1 | 6/2004 | Craig et al. |
| 6,763,370 B1 | 7/2004 | Schmeidler et al. |
| 6,765,864 B1 | 7/2004 | Natarajan et al. |
| 6,772,214 B1 | 8/2004 | McClain et al. |
| 6,775,704 B1 | 8/2004 | Watson et al. |
| 6,779,120 B1 | 8/2004 | Valente et al. |
| 6,782,379 B2 | 8/2004 | Lee |
| 6,804,221 B1 | 10/2004 | Magret et al. |
| 6,859,834 B1 | 2/2005 | Arora et al. |
| 6,868,406 B1 | 3/2005 | Ogg et al. |
| 6,879,995 B1 | 4/2005 | Chinta et al. |
| 6,901,433 B2 | 5/2005 | San Andres et al. |
| 6,957,237 B1 | 10/2005 | Traversat et al. |
| 7,003,587 B1 | 2/2006 | Battat et al. |
| 7,080,077 B2 | 7/2006 | Ramamurthy et al. |
| 7,124,203 B2 | 10/2006 | Joshi et al. |
| 7,134,137 B2 | 11/2006 | Joshi et al. |
| 7,185,364 B2 | 2/2007 | Knouse et al. |
| 7,194,764 B2 | 3/2007 | Martherus et al. |
| 7,231,661 B1 | 6/2007 | Villavicencio et al. |
| 7,249,369 B2 | 7/2007 | Knouse et al. |
| 7,290,288 B2 | 10/2007 | Gregg et al. |
| 7,346,923 B2 | 3/2008 | Atkins et al. |
| 2001/0037469 A1 | 11/2001 | Gupta et al. |
| 2001/0054153 A1 | 12/2001 | Wheeler et al. |
| 2002/0026563 A1 | 2/2002 | Chamberlain et al. |
| 2002/0032684 A1 | 3/2002 | Kobayashi et al. |
| 2002/0091745 A1 | 7/2002 | Ramamurthy et al. |
| 2002/0091798 A1 | 7/2002 | Joshi et al. |
| 2002/0099671 A1 | 7/2002 | Mastin Crosbie et al. |
| 2002/0112083 A1 | 8/2002 | Joshi et al. |
| 2002/0112155 A1 | 8/2002 | Martherus et al. |
| 2002/0112185 A1 | 8/2002 | Hodges |
| 2002/0116642 A1 | 8/2002 | Joshi et al. |
| 2002/0120599 A1 | 8/2002 | Knouse et al. |
| 2002/0129116 A1 | 9/2002 | Humphrey |
| 2002/0165960 A1 | 11/2002 | Chan |
| 2003/0061272 A1 | 3/2003 | Krishnamurthy et al. |
| 2003/0074580 A1 | 4/2003 | Knouse et al. |
| 2003/0145074 A1 | 7/2003 | Penick |
| 2003/0149737 A1 | 8/2003 | Lambert et al. |
| 2003/0158897 A1 | 8/2003 | Ben-Natan et al. |
| 2003/0191846 A1 | 10/2003 | Hunnicutt et al. |
| 2004/0117665 A1 | 6/2004 | Ong |
| 2005/0124320 A1 | 6/2005 | Ernst et al. |
| 2006/0021010 A1 | 1/2006 | Atkins et al. |
| 2006/0236382 A1 | 10/2006 | Hinton et al. |
| 2007/0162581 A1 | 7/2007 | Maes |

OTHER PUBLICATIONS

SiteMinder Agent Operations Guide, Version 4.0, Netegrity Inc., 1997, pp. 1-174.
SiteMinder Installation Guide, Version 4.0, Netegrity Inc., 1997, pp. 1-280.
SiteMinder Deployment Guide, Version 4.0, Netegrity Inc., 1997, pp. 1-314.
SiteMinder Developer's API Guide, Version 4.0, Netegrity Inc., 1997, pp. 1-368.
SiteMinder Policy Server Operations Guide, Version 4.0, Netegrity Inc., 1997, pp. 1-556.
Active Directory Collection, Microsoft TechNet, Mar. 28, 2003, p. 1.
Appendix B—ACL File Syntax, Sun Microsystems, Inc., iPianet Web Server: FastTrack Edition Administrator's Guide, Jul. 13, 2000, 7 pages.
Chapter 12—Controlling Access to Your Server, Sun Microsystems, Inc., iPianet Web Server: FastTrack Edition Administrator's Guide, Jul. 13, 2000, 24 pages.
Chapter 2 Syntax and Use of obj.conf, Sun Microsystems, Inc., iPianet Web Server, FastTrack Edition NSAPI Programmer's Guide, Jul. 20, 2000, 16 pages.
DNS—Contents, http://www2.rad.com/networks/1998/dns/main.htm, Dec. 7, 1999, 15 pages.
HP Introduces Next-Generation Web Authorization Products for E-Business, Hewlett-Packard, Press Release, Jan. 18, 1999, 3 pages.
HP Introduces Security for Microsoft NT Extranets, Portals and E-Services, Hewlett-Packard, Press Release, Jan. 17, 2000, 3 pages.
HP Provides Unprecedented Range of Authentication Options, Hewlett-Packard, Press Release, Sep. 1, 1999, 3 pages.
Introduction to SSL, Netscape Communications Corporation, http://developer.netscape.com/docs/manuals/security/sslin/contents.htm, Oct. 9, 1998, 12 pages.
Oblix CSA Solution Administration Guide, Oblix, Inc., Version 3.5, 1999, 328 pages.
U.S. Appl. No. 09/792,911, Advisory Action mailed on Aug. 9, 2005, 3 pages.
U.S. Appl. No. 09/792,911, Final Office Action mailed on May 9, 2005, 17 pages.
U.S. Appl. No. 09/792,911, Non-Final Office Action mailed on Dec. 2, 2005, 13 pages.
U.S. Appl. No. 09/792,911, Non-Final Office Action mailed on Sep. 9, 2004, 18 pages.
U.S. Appl. No. 09/792,915, Advisory Action mailed on Jun. 23, 2006, 4 pages.
U.S. Appl. No. 09/792,915, Final Office Action mailed on Jun. 30, 2005, 18 pages.
U.S. Appl. No. 09/792,915, Final Office Action mailed on Mar. 8, 2005, 19 pages.
U.S. Appl. No. 09/792,915, Final Office Action mailed on Apr. 3, 2006, 20 pages.
U.S. Appl. No. 09/792,915, Non-Office Action mailed on Jul. 23, 2004, 10 pages.
U.S. Appl. No. 09/792,915, Non-Final Office Action mailed on Oct. 4, 2005, 17 pages.
U.S. Appl. No. 09/792,918, Advisory Action mailed on Sep. 20, 2005, 3 pages.
U.S. Appl. No. 09/792,918, Final Office Action mailed on Jun. 21, 2005, 16 pages.
U.S. Appl. No. 09/792,918, Non-Final Office Action mailed on Sep. 8, 2004, 22 pages.
U.S. Appl. No. 09/792,934, Final Office Action mailed on Jun. 2, 2005, 10 pages.
U.S. Appl. No. 09/792,934, Non-Final Office Action mailed on Sep. 21, 2004, 19 pages.
U.S. Appl. No. 09/792,934, Non-Final Office Action mailed on Aug. 19, 2005, 5 pages.
U.S. Appl. No. 09/793,196, Advisory Action mailed on Jul. 21, 2005, 3 pages.
U.S. Appl. No. 09/793,196, Final Office Action mailed on May 31, 2006, 11 pages.
U.S. Appl. No. 09/793,196, Final Office Action mailed on Mar. 8, 2005, 13 pages.
U.S. Appl. No. 09/793,196, Non-Final Office Action mailed on Nov. 21, 2006, 11 pages.
U.S. Appl. No. 09/793,196, Non-Final Office Action mailed on Dec. 13, 2005, 12 pages.
U.S. Appl. No. 09/793,196, Non-Final Office Action mailed on Jul. 14, 2004, 13 pages.
U.S. Appl. No. 09/793,320, Advisory Action mailed on Jun. 7, 2006, 3 pages.
U.S. Appl. No. 09/793,320, Final Office Action mailed on Mar. 17, 2006, 18 pages.
U.S. Appl. No. 09/793,320, Final Office Action mailed on May 10, 2005, 19 pages.
U.S. Appl. No. 09/793,320, Office Action mailed on Sep. 20, 2005, 15 pages.
U.S. Appl. No. 09/793,320, Non-Final Office Action mailed on Aug. 4, 2004, 18 pages.
U.S. Appl. No. 09/793,354, Advisory Action mailed on Dec. 15, 2005, 3 pages.

(56) References Cited

OTHER PUBLICATIONS

U.S. Appl. No. 09/793,354, Final Office Action mailed on Apr. 19, 2004, 9 pages.
U.S. Appl. No. 09/793,354, Final Office Action mailed on Aug. 26, 2005, 9 pages.
U.S. Appl. No. 09/793,354, Non-Final Office Action mailed on Jan. 4, 2005, 8 pages.
U.S. Appl. No. 09/793,354, Non-Final Office Action mailed on Oct. 1, 2003, 12 pages.
U.S. Appl. No. 09/793,355, Advisory Action mailed on May 2, 2006, 3 pages.
U.S. Appl. No. 09/793,355, Advisory Action mailed on Jun. 21, 2005, 7 pages.
U.S. Appl. No. 09/793,355, Final Office Action mailed on Feb. 9, 2006, 15 pages.
U.S. Appl. No. 09/793,355, Final Office Action mailed on Apr. 6, 2005, 16 pages.
U.S. Appl. No. 09/793,355, Non-Final Office Action mailed on Mar. 12, 2004, 13 pages.
U.S. Appl. No. 09/793,355, Non-Final Office Action mailed on Sep. 7, 2005, 13 pages.
U.S. Appl. No. 09/793,658, Advisory Action mailed on Jan. 31, 2006, 3 pages.
U.S. Appl. No. 09/793,658, Final Office Action mailed on Nov. 2, 2005, 16 pages.
U.S. Appl. No. 09/793,658, Non-Final Office Action mailed on Sep. 9, 2004, 14 pages.
U.S. Appl. No. 09/814,091, Advisory Action mailed on Jul. 5, 2005, 3 pages.
U.S. Appl. No. 09/814,091, Final Office Action mailed on Apr. 8, 2005, 24 pages.
U.S. Appl. No. 09/814,091, Non-Final Office Action mailed on Nov. 1, 2005, 18 pages.
U.S. Appl. No. 09/814,091, Non-Final Office Action mailed on Jul. 14, 2004, 22 pages.
U.S. Appl. No. 09/814,091, Non-Final Office Action mailed on May 3, 2006, 7 pages.
U.S. Appl. No. 09/886,515, Final Office Action mailed on Feb. 14, 2006, 36 pages.
U.S. Appl. No. 09/886,515, Non-Final Office Action mailed on Sep. 7, 2006, 27 pages.
U.S. Appl. No. 09/886,515, Non-Final Office Action mailed on Dec. 28, 2004, 35 pages.
U.S. Appl. No. 09/886,515, Non-Final Office Action mailed on Aug. 29, 2005, 35 pages.
U.S. Appl. No. 11/330,963, Final Office Action mailed on Nov. 16, 2010, 23 pages.
U.S. Appl. No. 11/330,963, Final Office Action mailed on Jun. 12, 2009, 28 pages.
U.S. Appl. No. 11/330,963, Non-Final Office Action mailed on May 26, 2010, 20 pages.
U.S. Appl. No. 11/330,963, Non-Final Office Action mailed on Apr. 22, 2011, 25 pages.
U.S. Appl. No. 11/330,963, Non-Final Office Action mailed on Feb. 19, 2008, 26 pages.
U.S. Appl. No. 11/542,311, Final Office Action mailed on Sep. 11, 2007, 14 pages.
U.S. Appl. No. 11/542,311, Non-Final Office Action mailed on Jun. 8, 2007, 12 pages.
Barrett, Diary of a Break-And-Enter, Cyber Style, Technology in Government, Jan. 2000, 22 pages.
Cholter et al., I BAN: Intrusion Blocker Based on Active Networks, Proceedings of the DARPA Active Networks Conference and Exposition (DANCE'02), 2002, 11 pages.
Cooney, IBM Rolls Out Host- and Server-Based Mgmt. Apps, Network World, Framingham, vol. 12, Iss. 6, Feb. 6, 1995, pp. 6-7.
Easter, Method to Report Access Control of LAN Server Resources on a Per User Basis, IBM Technical Disclosure Bulletin, Apr. 1992, 172 Pages.
Good, The LDAP Data Interchange Format (LDIF)—Technical Specification, RFC 2849, Jun. 2000, 14 pages.
Hayes, Policy-Based Authentication and Authorization: Secure Access to the Network Infrastructure, IEEE ACSAC '00 Proceedings of the 16th Annual Computer Security Applications Conference, Dec. 2000, pp. 328-333.
Hitchens, et al., Design Choices for Symmetric Key Based Inter-domain Authentication Protocols in Distributed Systems, Computer Security Applications Conference, 12th Annual, Dec. 9-13, 1996, pp. 105-116.
Hodges et al., Lightweight Directory Access Protocol (v3): Extension for Transport Layer Security, RFC 2830, May 2000, 12 pages.
Howard et al., An Approach for using LDAP as a network Information Service, RFC 2307, Mar. 1998, 20 pages.
Janis, Reference Monitor-Creating Group Membership: IBM Technical Disclosure Bulletin, Mar. 1990, 431 pages.
Kim et al., Improving Cross-domain Authentication over Wireless Local Area Networks, Security and Privacy for Emerging Areas in Communications Networks, 2005 (SecureComm 2005; First International Conference, Sep. 5-9, 2005, pp. 127-138.
Leon, McAfee's NetTools Promises to Ease Network Desktop Diagnosis, InfoWorld, San Mateo, vol. 17, Issue 30, Jul. 24, 1995, 53 pages.
Lin et al., A Wireless-based Authentication and Anonymous Channels for Large Scale Area, Computers and Communications, Proceedings; Sixth IEEE Symposium, Jul. 3-5, 2001, pp. 36-41.
Luciani et al., Server Cache Synchronization Protocol (SCSP), RFC 2334, Apr. 1998, 39 pages.
Musthaler, The Trouble with Help Desk Selection, Network World, Framingham, vol. 12, Issue 8, Feb. 20, 1995, pp. 35-39.
Mwakalinga et al., Authorization System in Open Networks based on Attribute Certificates, http://www.dsv.su.se/-matei/courses/3%20-%202i1272/L3b.pdf., Feb. 20, 2007, 17 pages.
Park et al., Secure Cookies on the Web, IEEE Internet Computing, Jul./Aug. 2002, pp. 36-44.
Pfitzmann et al., Analysis of Liberty Single-Sign-On With Enabled Clients, IEEE Internet Computing, vol. 7, Issue 6, Nov./Dec. 2003, pp. 38-44.
Phipatanasuphorn et al., Vulnerability of Sensor Networks to Unauthorized Traversal and Monitoring, IEEE Transactions on Computers, vol. 53, No. 3, Mar. 2004, pp. 364-369.
Piscitello et al., Project Guards Laptop and Desktop Data, InfoWorld, Jun. 21, 1999, pp. 48 and 54.
Schmersal, Testing to maintain service standards, Communications News, Nokomis, vol. 35, Issue 3, Mar. 1999, pp. 22-23.
Skaggs et al., Network Vulnerability Analysis, IEEE, 2002, pp. III-493-III-495.
Stokes et al., Access Control Requirements for LDAP, RFC 2820, May 2000, 9 pages.
Wahl et al., Authentication Methods for LDAP, RFC 2829, May 2000, 16 pages.
Wahl et al., Lightweight Directory Access Protocol (v3), RFC 2251, Dec. 1997, 48 pages.
Walsh, Remedy releases three applications for help-desk suite, InfoWorld, San Mateo, vol. 19, Issue 16, Apr. 21, 1997, 34 pages.
Wilde et al., XPath, Xlink, XPointer, and XML: A Practical Guide to Web Hyperlinking and Transclusion, Chapter 3 Section 2, Addison Wesley Professional, Jul. 23, 2002.
Wu et al., Personalization With Dynamic Profiler, Proceedings of the Third International Workshop on Advanced Issues of E-Commerce and Web-Based Information Systems, Jun. 2001, pp. 12-20.
Yaacovi et al., Lightweight Directory Access Protocol (v3): Extensions for Dynamic Directory Services, RFC 2589, May 1999, 12 pages.

USING IDENTITY/RESOURCE PROFILE AND DIRECTORY ENABLERS TO SUPPORT IDENTITY MANAGEMENT

CROSS-REFERENCES TO RELATED APPLICATIONS

The present application is a divisional of U.S. patent application Ser. No. 11/330,963 filed Jan. 11, 2006, the entire contents of which is incorporated herein by reference for all purposes.

BACKGROUND OF THE INVENTION

Embodiments of the present invention relate generally to identity management and access control and more particularly to using a directory enabler and/or profile enabler to support identity management functions.

With the growth of e-business, organizations are wrestling with the challenge of managing secure access to information and applications scattered across a wide range of internal and external computing systems. Furthermore, these organizations need to provide access to a growing number of users, both inside and outside the corporation, without diminishing security or exposing sensitive information. The management of multiple versions of user identities across multiple applications makes the task even more daunting.

Identity management generally includes the concepts of authenticating, i.e., determining that a party is actually who he claims to be, and authorizing, i.e., determining whether a party is authorized or has permission to perform some task, access some resource, etc. Identity management also includes managing attributes e.g., properties, metadata, other identities, preferences, subscriptions, etc., associated with the user. Identity management can also include the notion of anonymizing a user or hiding his identity from those systems or users with which he interacts. However, combining the functions of authentication and authorization with anonymization can be problematic.

Existing methods for combining authentication and authorization with anonymization rely on trust relationships between members of a group or federation. That is, one member of a group may use the authentication and authorization of a user provided by another member of a trusted group. One example of such an arrangement is the use of a single sign-on server. Through a single sign-on server, a user can sign on once and access a number of different servers and/or resources of a group represented by the single sign-on server. Furthermore, the user may be anonymous to the servers of the group. For example, the user may supply his user name and password to the single sign-on server so that he can be authenticated and/or authorized. The single sign-on server may then in turn provide the user with a sign-on identifier or other token that the user can supply to the other servers of the group to prove he is authenticated and/or authorized by the single sign-on server. Since the servers of the group trust the single sign-on server and the tokens supplied by it, the servers can use those tokens rather than the user's other identity information. In this way, the user can remain anonymous to the servers.

However, such trust networks or federations presume that members have perfect knowledge and trust of all other members and require that the network or federation be well established beforehand. This can severely limit the network's ability to expand and handle new users and/or members. The problem is that the federation or "circle of trust" must exist in advance. There is no way for such networks or federations to discover new members as they may be needed or to expand dynamically to handle new members and/or users. That is, current trust relationships must be established and exist before they can be used and there is no way to dynamically discover new members and expand the trust relationship as needed. Hence, there is a need for methods and systems that allow systems to use the existing entities with simple mechanisms to dynamically provide identity management or other services where needed.

BRIEF SUMMARY OF THE INVENTION

Systems, methods, and machine-readable media are disclosed for dynamically providing identity management or other services. In one embodiment, a method of providing a service related to an unknown principal can comprise receiving a request related to the unknown principal. Receiving the request related to the unknown principal can comprise receiving the request from the unknown principal, from a requesting service, or from another entity.

After receiving the request related to the unknown principal, a service to which the principal is known can be located. Locating the service to which the principal is known can be based on one or more identity attributes related to the principal. According to one embodiment, the service can be selected from a list of services based on the identity attributes related to the principal which may include, in some cases, the identity itself. In some cases, the identity attributes related to the principal can be provided by the principal. In one example, an identifier from the principal may itself contain the details, e.g. a URI, of where the service can be located. Alternatively, locating the service to which the principal is known can comprise querying a plurality of services, receiving a response from at least some of the plurality of services indicating whether the principal is known, and selecting a service from the plurality of services based on the response from that service.

Once the service has been located, an identity management result related to the principal can be obtained from the service to which the principal is known. According to one embodiment, the method can further comprise obtaining an identity management result related to the principal from the service to which the principal is known. Obtaining the identity management result related to the principal from the service to which the principal is known can include, but is not limited to, obtaining a security token related to the principal, obtaining an identity attribute related to the principal, changing an identity attribute related to the principal, affecting the principal, etc.

According to another embodiment, a system can comprise a plurality of services adapted to affect or utilize an identity management result and a directory enabler communicatively coupled with one or more of the services. The directory enabler can be adapted to receive a request related to a principal from a requestor to which the principal is unknown, select a service to which the principal is known from the plurality of services based on one or more identity attributes related to the principal, and send information identifying the selected service to the requestor.

According to yet another embodiment, a system can comprise a plurality of services adapted to affect or utilize an identity management result and a profile enabler communicatively coupled with one or more of the services and adapted to receive a request related to a principal. The system can also include a directory enabler communicatively coupled with the profile enabler and adapted to select a service to which the principal is known from the plurality of services based on one or more identity attributes related to the principal.

DETAILED DESCRIPTION OF THE INVENTION

Figure 1:
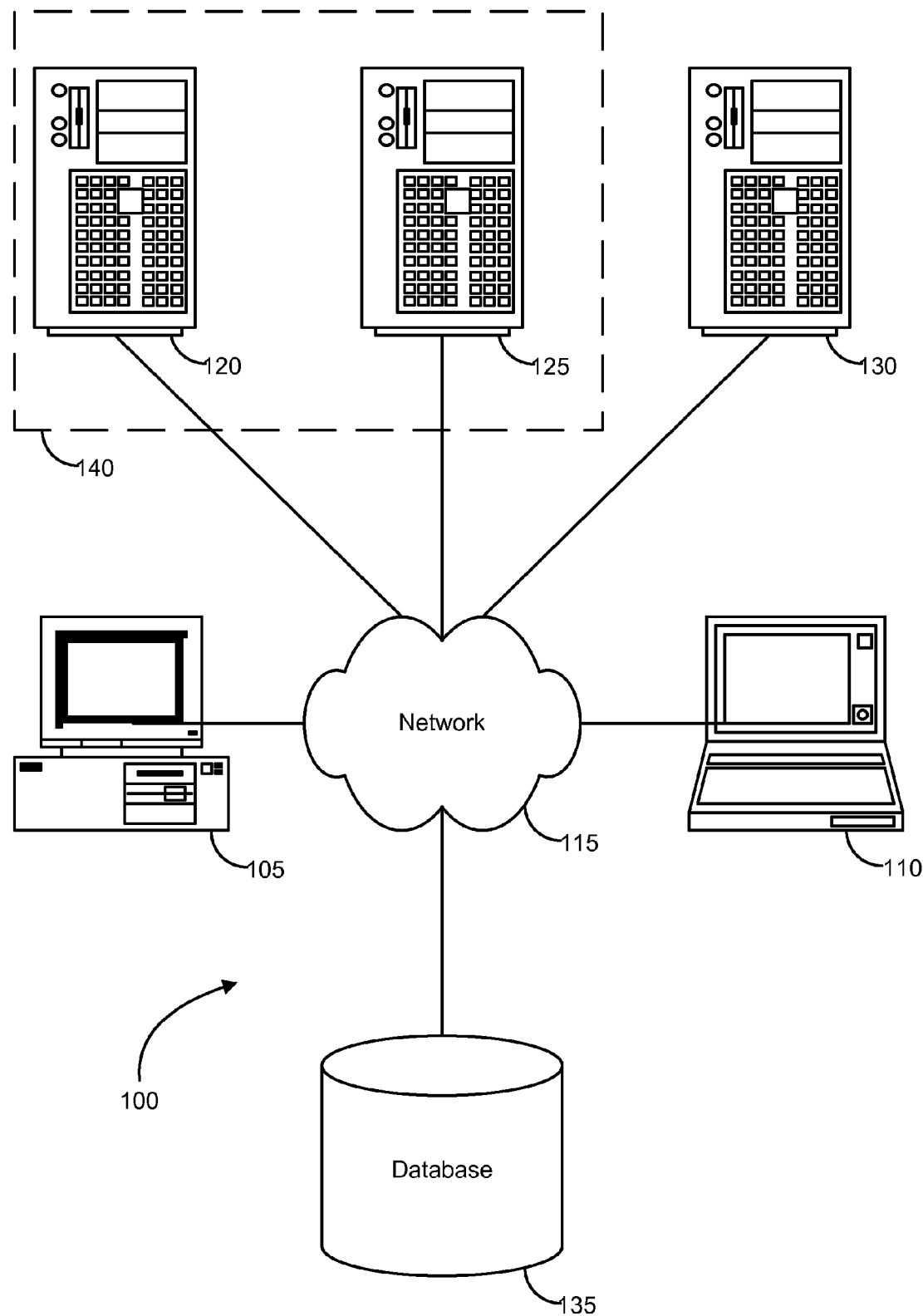
FIG. 1 is a block diagram illustrating components of an exemplary operating environment in which various embodiments of the present invention may be implemented.

In the following description, for the purposes of explanation, numerous specific details are set forth in order to provide a thorough understanding of various embodiments of the present invention. It will be apparent, however, to one skilled in the art that embodiments of the present invention may be practiced without some of these specific details. In other instances, well-known structures and devices are shown abstracted in block diagram form.

Embodiments of the present invention provide methods, system and machine-readable media for dynamically providing identity management services. Identity management services provided by various embodiments discussed herein include any services related to authentication, authorization, anonymization, or other management and/or control of identity information. Such services can include, for example, authentication services that authenticate an identity of a principal to an end requestor and make assertions in the form of security tokens based on evidence that it trusts. In another example, an identity management service may include an identity attribute service that maintains information or attributes about principals and validates and responds to requests for information about principals. Alternatively or additionally, an identity attribute service can provides attributes or services that report or affect the principal. For example, the service can obtain or retrieve a principal's preferences, location, presence, change the principal's preferences or subscriptions (e.g. add one), or send the principal a message, etc.

As used herein, the term principal refers to a person, system, or other entity capable of making a request to a resource or receiving a request or being affected by services. A principal can have a limited capability such as a browser, or more sophisticated capability such as a web service, for example, when the principal is an application or service provider or other business entity. The term resource is used to refer to a service, application, or other function from which something is accessed by a principal. A security token represents a collection of claims which can include identifiers, aliases, pseudonyms, attributes, etc.

It should be noted that, while discussed herein in terms of an identity management service, embodiments of the present invention are equally applicable to any service providing identity management services and/or any other service related to the principal. For example, the service can provides attributes or services that report or affect the principal. Such services can include but are not limited to obtaining or retrieving a principal's preferences, location, presence, changing the principal's preferences or subscriptions (e.g. add one), sending the principal a message, etc.

Generally speaking, dynamically providing identity management or other services can comprise receiving a request to access a resource from an unknown principal. That is, the principal is anonymized or uses an identity that is not yet known by the target. So, the principal is unknown to the target when request is made. The principal may be either totally or partially unknown to the target. That is, the target may have no knowledge of any identity attributes of the principal or may have knowledge of some identity attributes of the principal but not others. For example, the target may know an identifier or alias of the principal but may not yet know if that identity is authenticated.

An identity management service or other services to which the principal is known, i.e. a service that can complete the missing information about the principal, can be located. According to one embodiment, locating an identity management service or other service to which the principal is known can be based on one or more identity attributes provided by the principal. In some cases, the identity attributes can include an indication of the id itself. As discussed herein, the identity attributes can be considered to include such an indication. However, such an indication is not required. In some cases, the information provided by the principal may include a Universal Resource Identifier (URI) or other information identifying a service to which the principal is known.

In some cases, locating the service to which the principal is known can comprise selecting a service from a stored, queryable, and/or discoverable list of services based on the identity attributes provided by the principal. In other cases, locating the service to which the principal is known can comprise querying a plurality of services, receiving a response from at least some of the plurality of services indicating whether the principal is known, and selecting a service from the plurality of services based on the response from that service.

Once an identity management service or other service to which the principal is known has been located, an identity management result can obtained from the identity management service. For example, in the case of authentication, according to one embodiment, obtaining an identity management result from the identity management service can comprise requesting a security token from the identity management service and receiving the security token from the identity management service. According to an alternative embodiment, obtaining an identity management result from the identity management service can comprise redirecting the principal to the identity management service and receiving the security token from the principal. The method can further comprise determining, based on the security token, whether the principal is authorized to access the requested resource. In response to determining the principal is authorized, the requested resource can be accessed. In other cases, attributes or information can be obtained or affected or the principal can be affected. For example, the service can provide some identity management service such as authentication or other type of service such as obtaining or retrieving a principal's preferences, location, presence, changing the principal's preferences or subscriptions (e.g. add one), sending the principal a message, etc.

Embodiments of the present invention may be implemented in a wide variety of environments and systems. For example, various embodiments may be presented through an Internet web browser and/or a web service. Other types of client-server, peer-to-peer, or other environments are considered to be equally suitable for implementing embodiments of the present invention.

FIG. 1 is a block diagram illustrating components of an exemplary operating environment in which various embodiments of the present invention may be implemented. The system 100 can include one or more user computers 105, 110, which may be used to operate a client, whether a dedicate application, web browser, etc. The user computers 105, 110 can be general purpose personal computers (including, merely by way of example, personal computers and/or laptop computers running various versions of Microsoft Corp.'s Windows and/or Apple Corp.'s Macintosh operating systems) and/or workstation computers running any of a variety of commercially-available UNIX or UNIX-like operating systems (including without limitation, the variety of GNU/Linux operating systems). These user computers 105, 110 may also have any of a variety of applications, including one or more development systems, database client and/or server applications, and web browser applications. Alternatively, the user computers 105, 110 may be any other electronic device, such as a thin-client computer, Internet-enabled mobile telephone, and/or personal digital assistant, capable of communicating via a network (e.g., the network 115 described below) and/or displaying and navigating web pages or other types of electronic documents. Although the exemplary system 100 is shown with two user computers, any number of user computers may be supported.

In some embodiments, the system 100 may also include a network 115. The network may be any type of network familiar to those skilled in the art that can support data communications using any of a variety of commercially-available protocols, including without limitation TCP/IP, SNA, IPX, AppleTalk, and the like. Merely by way of example, the network 115 maybe a local area network ("LAN"), such as an Ethernet network, a Token-Ring network and/or the like; a wide-area network; a virtual network, including without limitation a virtual private network ("VPN"); the Internet; an intranet; an extranet; a public switched telephone network ("PSTN"); an infra-red network; a wireless network (e.g., a network operating under any of the IEEE 802.11 suite of protocols, the Bluetooth protocol known in the art, and/or any other wireless protocol); and/or any combination of these and/or other networks.

The system may also include one or more server computers 120, 125, 130 which can be general purpose computers and/or specialized server computers (including, merely by way of example, PC servers, UNIX servers, mid-range servers, mainframe computers rack-mounted servers, etc.). One or more of the servers (e.g., 130) may be dedicated to running applications, such as a business application, a web server, application server, etc. Such servers may be used to process requests from user computers 105, 110. The applications can also include any number of applications for controlling access to resources of the servers 120, 125, 130.

The web server can be running an operating system including any of those discussed above, as well as any commercially-available server operating systems. The web server can also run any of a variety of server applications and/or mid-tier applications, including HTTP servers, FTP servers, CGI servers, database servers, Java servers, business applications, and the like. The server(s) also may be one or more computers which can be capable of executing programs or scripts in response to the user computers 105, 110. As one example, a server may execute one or more web applications. The web application may be implemented as one or more scripts or programs written in any programming language, such as Java™, C, C# or C++, and/or any scripting language, such as Perl, Python, or TCL, as well as combinations of any programming/scripting languages. The server(s) may also include database servers, including without limitation those commercially available from Oracle, Microsoft, Sybase™, IBM™ and the like, which can process requests from database clients running on a user computer 105, 110.

In some embodiments, an application server may create web pages dynamically for displaying on an end-user (client) system. The web pages created by the web application server may be forwarded to a user computer 105 via a web server. Similarly, the web server can receive web page requests and/or input data from a user computer and can forward the web page requests and/or input data to an application and/or a database server. Those skilled in the art will recognize that the functions described with respect to various types of servers may be performed by a single server and/or a plurality of specialized servers, depending on implementation-specific needs and parameters.

The system 100 may also include one or more databases 135. The database(s) 135 may reside in a variety of locations. By way of example, a database 135 may reside on a storage medium local to (and/or resident in) one or more of the computers 105, 110, 115, 125, 130. Alternatively, it may be remote from any or all of the computers 105, 110, 115, 125, 130, and/or in communication (e.g., via the network 120) with one or more of these. In a particular set of embodiments, the database 135 may reside in a storage-area network ("SAN") familiar to those skilled in the art. Similarly, any necessary files for performing the functions attributed to the computers 105, 110, 115, 125, 130 may be stored locally on the respective computer and/or remotely, as appropriate. In one set of embodiments, the database 135 may be a relational database, such as Oracle 10g, that is adapted to store, update, and retrieve data in response to SQL-formatted commands.

Figure 2:
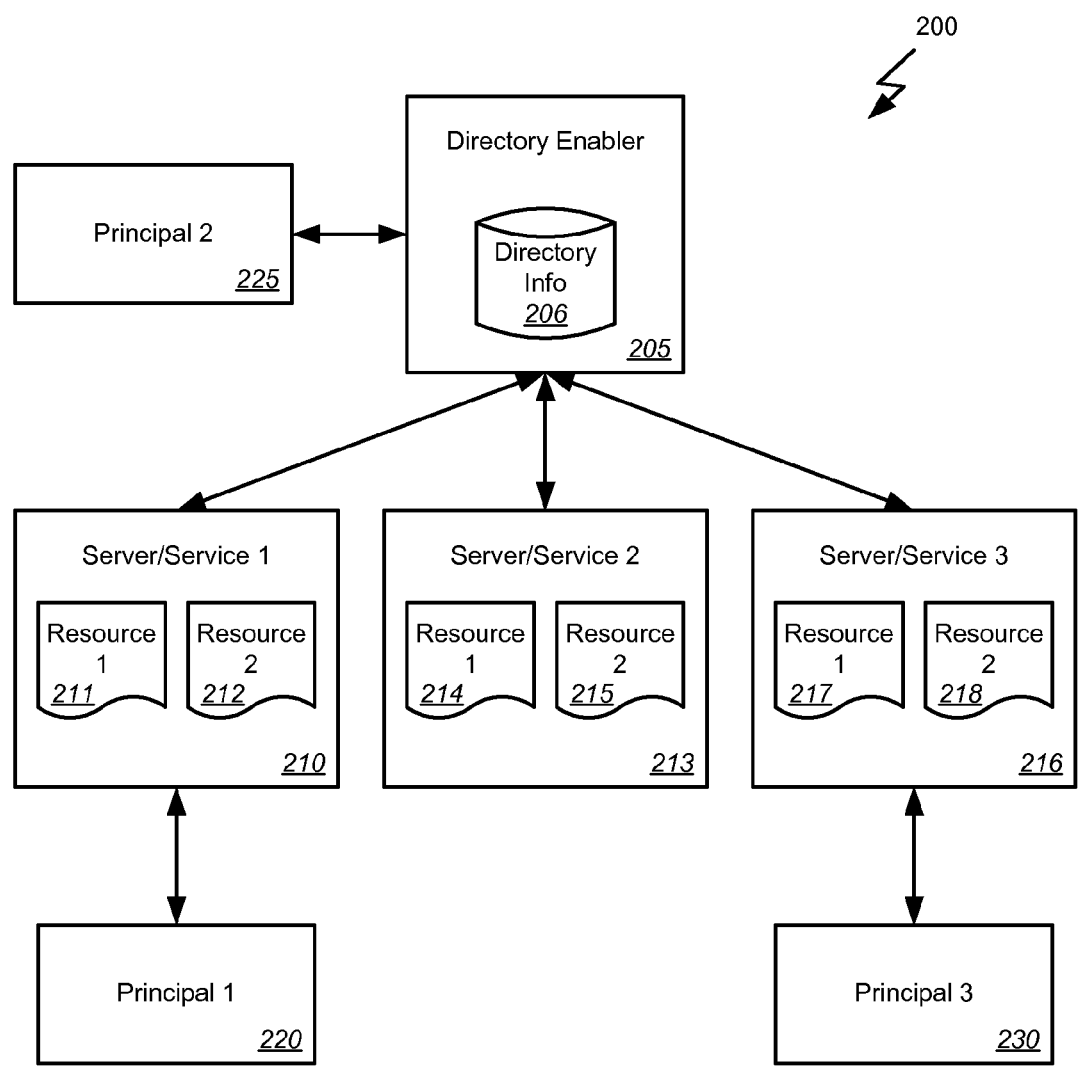
FIG. 2 is a block diagram illustrating, at a high level, functional components of a system including a directory enabler for locating an identity management service or other service providing principal attributes according to one embodiment of the present invention.

FIG. 2 is a block diagram illustrating, at a high level, functional components of a system including a directory enabler for locating an identity management service or other service providing principal attributes according to one embodiment of the present invention. This example represents, conceptually, components that may be implemented in an environment such as described above with reference to FIG. 1 or any other suitable environment for providing the functions of locating and providing various identity management services or other services that report and/or affect the principal.

As illustrated here, the system 200 includes a plurality of identity management services 210, 213, and 216. Again, these services 210, 213, and 216 can also be other types of services that provide information about one or more principals, update the information, and/or otherwise affect the principals. These services 210, 213, and 216 may be implemented on separate servers, as illustrated here, and/or in separate domains possibly by different service providers or on the same server, machine, or domain. As introduced above, these services 210, 213, and 216 can include any services related to authentication, authorization, anonymization, or other management and/or control of identity information or otherwise report and/or affect the principal. For example, a service 216 may include an identity attribute service that maintains information or attributes about principals 220-230 known to that service 216 and validates and responds to requests for information about those principals 220-230. Additionally, the services 210, 213, and 216 can control access to one or more resources 211, 212, 214, 215, 217, and 218. The resources 211, 212, 214, 215, 217, and 218 may be maintained within and/or as part of the service as shown here or may be external to the server or service. In either case, the services 210, 213, and 216 can control access to the resource 211, 212, 214, 215, 217, and 218 in conjunction with, instead of, or in addition to the identity management services. In other cases, services 210, 213, and 216 can provides attributes or services that report or affect the principal. For example, the service can obtain or retrieve a principal's preferences, location, presence, change the principal's preferences or subscriptions (e.g. add one), or send the principal a message, etc.

The system 200 can include a directory enabler 205 communicatively coupled with one or more services 210, 213, and 216. Principals 220-230 can be in communication with services 210 and 216 and/or the directory enabler 205. The directory enabler 205 can receive a request directly from a principal 225 or through one of the services 210 with which the principal 220 is in communication. In other words, the principal 220 can act as a requestor of some identity management service. Alternatively, the directory enabler 205 may also receive the request from an application or resource that tries to do identity management, authenticate/authorize the principal, access principal attributes, or affect the attributes or the principal. In such a case, the service or server on which the application executes can be considered the requestor.

So, for example, a principal 220 may request a resource 211 or service 210. As a result, the service 210 may need to access or affect an attribute of the principal 220 or affect the principal 220. In either case, the service 210 may also need to authenticate the principal. However, that principal 220 may be unknown to that service 210. In order to identify the principal 220, the service 210 can pass the request or information from the request, such as identity information from the principal 220, to the directory enabler 205. The identity information from the principal 220 can include, by way of example and not limitation, a user name, alias, or other identifying information.

The directory enabler 205 can then select another one of the services 213 or 216 to whom the principal 220 is known by, for example, prior transactions, etc. In such case, the request to the directory enabler 205 may represent a request to identify which service can provide that function for that principal 220. The directory enabler 205 can include a data store 206 that includes a list of or other information identifying services 210, 213, and 215 of which the directory enabler 205 is aware. In such a case, the directory enabler 205 can be adapted to select the service 216 to which the principal 220 is known from the list of services in the data store 206 based on the identity attributes provided by the principal 220. Alternatively, the directory enabler 205 can be adapted to locate the service 216 to which the principal 220 is known by querying the services 213 and 216 and receiving a response from at least some of the services 213 and 216 indicating whether the principal 220 is known. In such a case, selecting the service 216 can be based on the response from that service 216. Additionally, the directory enabler 205 may be adapted to register the services discovered in such a query and/or register the identities and which service provides what functions for them.

Additionally, it should be noted that these actions may be chained/recurrent. For example, the directory enabler 205 may locate a first service 216 that can provide identity management for the principal 220. The requestor (service or other) can then request that the located service 216 identify a second service 213 that can perform the desired functions. The first service 216 may have the answer or use the directory enabler 205 to answer that question. When the answer is known the result can be return and the original requestor to make the request to the right service provider 213.

According to one embodiment of the present invention, after the directory enabler 205 selects a service 216 to which the principal 220 is known, the service 210, principal 220, or other entity making the request, i.e., the requestor, can request a security token related to the principal 220 from the selected service 216. The requestor, in this case, service 210, can then obtain from the selected service 216 a security token or other information related to the principal 220 that can be used by the requesting service 210 to authenticate the principal 220 and/or authorize the requested access. Alternatively, the requestor may request the selected service 216 to perform some function related to the principal 220 such as access or modify some attributes, obtain or retrieve a principal's preferences, location, presence, change the principal's preferences or subscriptions (e.g. add one), or send the principal a message, etc. In either case, the service 216 may, according to one embodiment, first seek approval from the principal 220 prior to performing any action. That is, the service 216 may contact and inform the principal 220 of a pending access or action and wait for the principal's approval before performing the access or action.

The requesting service 210 can obtain the security token related to the principal 220 from the selected service 216 by, for example, requesting the security token from the selected service 216. In such a case, the requestor can be adapted to receive the security token from the selected service 216. The requesting service 210 can then determine, based on the security token, whether the principal 220 is authorized to access the requested resource 211. In response to determining the principal 220 is authorized, the service 210 can access the requested resource 211. Alternatively, the requesting service 210 can obtain the security token related to the principal 220 from the selected service 216 by redirecting the principal 220 to the selected service 216 to obtain the security token. In such a case, the requesting service 210 can then receive the security token from the principal 220 and determine, based on the security token, whether the principal 220 is authorized to access the requested resource 211. In response to determining the principal 220 is authorized, the service 210 can access the requested resource 211.

According to one embodiment of the present invention, the service 210 making the request to the directory enabler 205 may comprise a policy enforcer as described in U.S. patent application Ser. No. 10/855,999 entitled "Method and Apparatus for Supporting Service Enablers via Service Request Handholding" filed on May 28, 2004 and U.S. patent application Ser. No. 10/856,588 entitled "Method and Apparatus for Supporting Service Enablers via Service Request Composition" filed on May 28, 2004. In such case, the policy enforcer performs orchestration and makes requests to the directory enabler 205 then acts on the results or delegates the action to the profile enabler. Based on policies it may also decide to use the option to redirect the requestor or to make the request itself to the service selected by the directory enabler.

Figure 3:
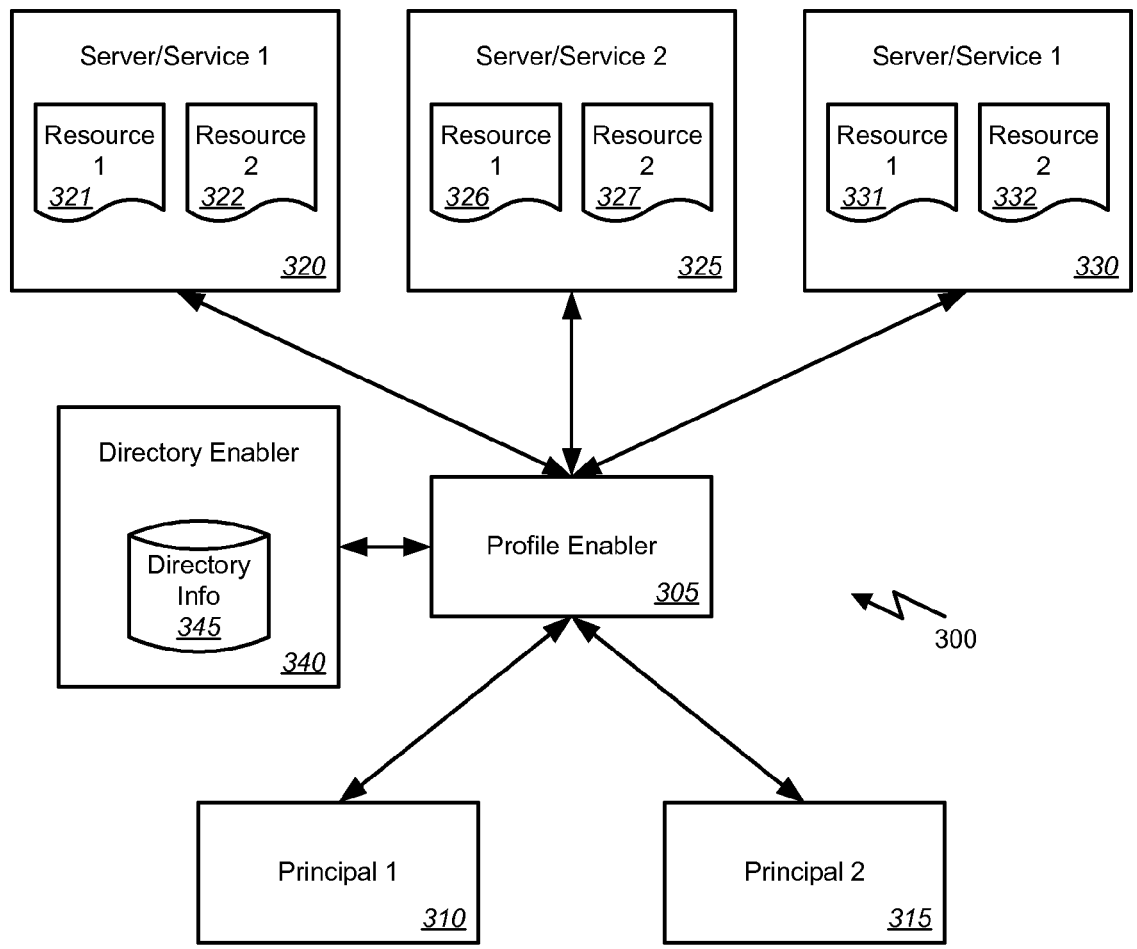
FIG. 3 is a block diagram illustrating, at a high level, functional components of a system including a directory enabler for locating an identity management service or accessing other principal related information or attributes according to an alternative embodiment of the present invention.

FIG. 3 is a block diagram illustrating, at a high level, functional components of a system including a directory enabler for locating an identity management service or accessing other principal related information or attributes according to an alternative embodiment of the present invention. In this example, the system 300 includes a plurality of services 320, 325, and 330, a profile enabler 305 communicatively coupled with one or more of the services 320, 325, and 330, a directory enabler 340 communicatively coupled with the profile enabler 305, and one or more principals 310 and 315 communicatively coupled with the profile enabler 305.

As in the previous example, the services 320, 325, and 330 can control access to one or more resources 321, 322, 326, 327, 331, and 332. The resources 321, 322, 326, 327, 331, and 332 may be maintained within and/or as part of the service as shown here or may be external to the server or service. In either case, the services 320, 325, and 330 can control access to the resource 321, 322, 326, 327, 331, and 332 using the profile enabler 305. Also, as noted previously, the services 320, 325, and 330 can provide identity management services and/or other services that report and/or affect the principal.

It should be noted that while illustrated in FIG. 3 as being separate elements, the profile enabler 305 and directory enabler 340 may be implemented on the same machine and/or by the same software. In such a case the blocks illustrating the profile enabler 305 and the directory enabler 340 may represent operational modules, processes, routines, etc. Alternatively, the profile enabler 305 and directory enabler 340 may be implemented separately. For example, the profile enabler 305 and directory enabler may be implemented and/or operated on separate servers. Therefore, it should be understood that this representation of the profile enabler 305 and directory enabler 340 as separate elements is conceptual and represents only the distinction in the functions performed by each.

Regardless of exactly how it is implemented, the profile enabler 305 can be adapted to receive a request to access a resource 321, 322, 326, or 327, access a service 325 or 330, affect attributes of a principal, affect a principal, etc. The profile enabler 305 can receive the request directly from the principal 310 or through one of the services with which the principal 310 is in communication. The profile enabler 305 can then forward the request to the directory enabler 340 or request the directory enabler 340 to select a service 320, 325, or 330 to which the principal 310 is known. As in the previous example, this selection can be based on one or more identity attributes provided by the principal 310 such as an alias, user name, or other identifying information. The profile enabler 305 can then obtain a security token related to the principal 310 from the identity management service 325 selected by the directory enabler 340.

So, for example, a principal 310 may request a resource 321 or service from one of the services 320 via the profile enabler 305 or directly from the service 320. In order to identify the principal 310 and determine whether to allow access to the requested resource 321, the profile enabler 305 passes the request or information from the request, such as identity information from the principal 310, to the directory enabler 340. The directory enabler 340 can then select one of the services 325 or 330 to whom the principal 310 is known. The profile enabler 305 can then obtain from the selected service 325 a security token related to the principal 310 that can be used by the requesting service 320 or principal 310 to authenticate the principal 310 and/or authorize the requested access, provide some identity management service or other service, or otherwise affect the principal 310.

As in the previous example, the directory enabler 340 can include a data store 345 that includes directory information identifying services 325 and 330 of which the directory enabler 305 is aware. In such a case, the directory enabler 340 can be adapted to select the service 325 to which the principal 310 is known from the list of services in the data store 345 based on the identity attributes provided by the principal 310. Alternatively, the directory enabler 340 can be adapted to locate the service 325 to which the principal 310 is known by querying, either directly or through the profile enabler 305, the services 325 and 330 and receiving a response from at least some of the services 325 and 330 indicating whether the principal 310 is known. In such a case, selecting the service 325 can be based on the response from that service 325.

Once the directory enabler 340 selects a service 325 to which the principal 310 is known, the profile enabler 305 can obtain a security token or other information related to the principal 310 from the selected service 325 by, for example, requesting the security token from the selected service 325. In such a case, the profile enabler 305 can be adapted to receive the security token from the selected service 325. The requesting service 320 can then determine, based on the security token, whether the principal 310 is authorized to access the requested resource 321 or perform the requested functions. In response to determining the principal 310 is authorized, the service 320 can access the requested resource 321 or perform the requested function. Alternatively, the profile enabler 305 may request the selected service 325 to perform some function related to the principal 310 such as access or modify some attributes, obtain or retrieve a principal's preferences, location, presence, change the principal's preferences or subscriptions (e.g. add one), or send the principal a message, etc. In either case, the service 325 may, according to one embodiment, first seek approval from the principal 310 prior to performing any action. That is, the service 325 may contact and inform the principal 310 of a pending access or action and wait for the principal's approval before performing the access or action.

Alternatively, the profile enabler 305 can obtain the security token related to the principal 310 from the selected service 325 by redirecting the principal 310 to the selected service 325 to obtain the security token. In such a case, the requesting service 320 can then receive the security token from the principal 310 and determine, based on the security token, whether the principal 310 is authorized to access the requested resource 321 or perform the requested function. In response to determining the principal 310 is authorized, the service 320 can access the requested resource 321 or perform the requested function.

Generally speaking, the profile enabler 305 can be used to answer a request about an identity while the directory enabler 340 can identify what service can answer a request about a particular identity. So, the profile enabler 305 accepts a request about an identity and returns the result. The directory enabler 340 finds what services can answer a request about an identity and may explain how to formulate the requests. A separate profile enabler 305, while not necessary, serves the purpose of hiding the directory enabler 340 and possibly other identity information from the requestor.

Therefore, the profile enabler 305 can be used to delegate a task related to a principal 310 that is unknown. For example, a principal 310 or a service 320 can send a message to the profile enabler 305 requesting, for example, to authenticate a particular principal, to locate a particular principal, etc. The profile enabler 305 marshals all the function, either internally or with the directory enabler 340, and/or with a selected services until it has completed the delegated request or failed. That is, the profile enabler 305 can locate a principal or service to which to delegate the task, can send a request for the task to that principal or service, and can receive a response to that request. The profile enabler 305 can then return a result or a status to the requester.

Figure 4:
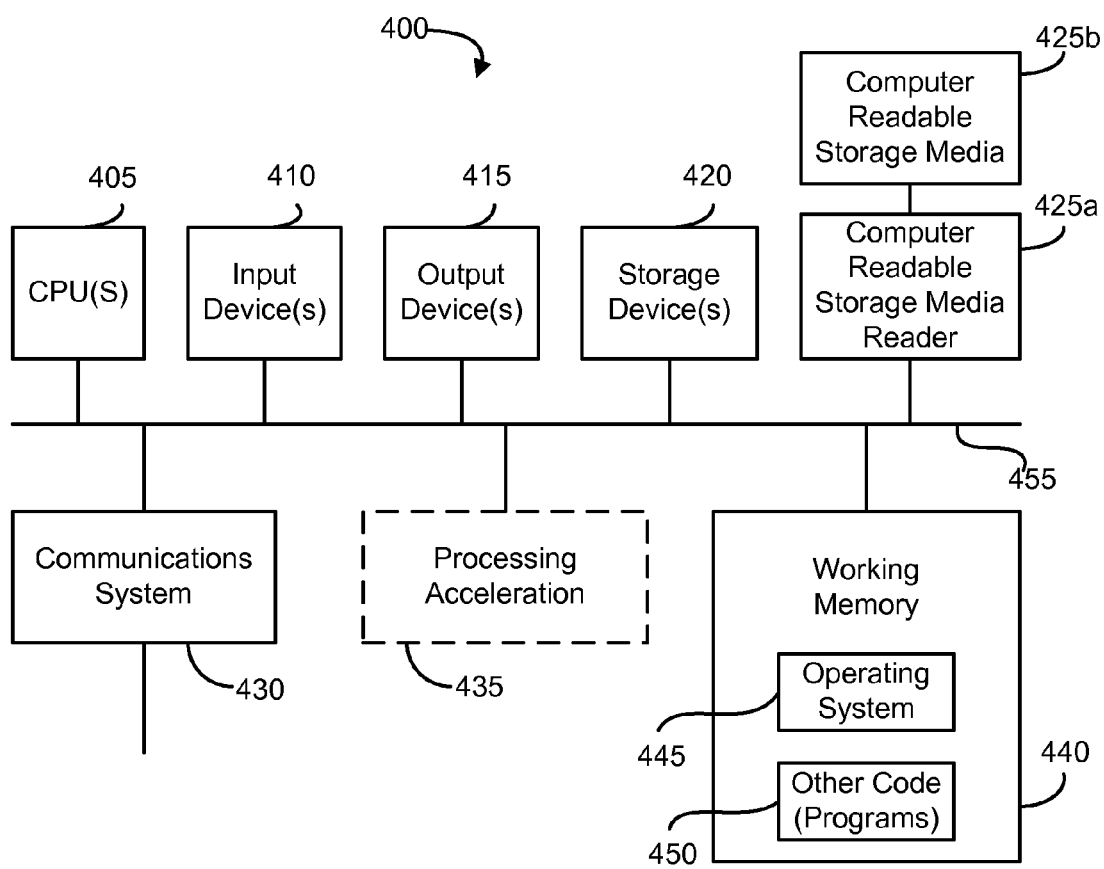
FIG. 4 is a block diagram illustrating an exemplary computer system in which embodiments of the present invention may be implemented.

FIG. 4 illustrates an exemplary computer system 400, in which various embodiments of the present invention may be implemented. The system 400 may be used to implement any of the computer systems described above such as the server computers or the user computers. The computer system 400 is shown comprising hardware elements that may be electrically coupled via a bus 455. The hardware elements may include one or more central processing units (CPUs) 405, one or more input devices 410 (e.g., a mouse, a keyboard, etc.), and one or more output devices 415 (e.g., a display device, a printer, etc.). The computer system 400 may also include one or more storage device 420. By way of example, storage device(s) 420 may be disk drives, optical storage devices, solid-state storage device such as a random access memory ("RAM") and/or a read-only memory ("ROM"), which can be programmable, flash-updateable and/or the like.

The computer system 400 may additionally include a computer-readable storage media reader 425a, a communications system 430 (e.g., a modem, a network card (wireless or wired), an infra-red communication device, etc.), and working memory 440, which may include RAM and ROM devices as described above. In some embodiments, the computer system 400 may also include a processing acceleration unit 435, which can include a DSP, a special-purpose processor and/or the like.

The computer-readable storage media reader 425a can further be connected to a computer-readable storage medium 425b, together (and, optionally, in combination with storage device(s) 420) comprehensively representing remote, local, fixed, and/or removable storage devices plus storage media for temporarily and/or more permanently containing computer-readable information. The communications system 430 may permit data to be exchanged with the network 420 and/or any other computer described above with respect to the system 400.

The computer system 400 may also comprise software elements, shown as being currently located within a working memory 440, including an operating system 445 and/or other code 450, such as an application program (which may be a client application, web browser, mid-tier application, RDBMS, etc.). The application programs may have and/or designed to implement methods of the invention.

It should be appreciated that alternate embodiments of a computer system 400 may have numerous variations from that described above. For example, customized hardware might also be used and/or particular elements might be implemented in hardware, software (including portable software, such as applets), or both. Further, connection to other computing devices such as network input/output devices may be employed. Software of computer system 400 may include code 450 for implementing any or all of the elements of the systems for locating and providing services as described above with reference to FIGS. 2 and 3.

Generally speaking, a method of providing identity management or other services can comprise receiving a request to access a resource from an unknown principal. A service to which the principal is known can be located. According to one embodiment, locating a service to which the principal is known can be based on one or more identity attributes provided by the principal. In some cases, locating the service to which the principal is known can comprise selecting a service from a stored list of services based on the identity attributes provided by the principal. In other cases, locating the service to which the principal is known can comprise querying a plurality of services, receiving a response from at least some of the plurality of services indicating whether the principal is known, and selecting a service from the plurality of services based on the response from that service.

Two basic scenarios can be considered for illustrative purposes. In one scenario, a principal makes a request of a resource but the resource, or system controlling access to the resource, requires the principal to be authenticated. In a second scenario, a principal makes a request of a resource but, in order to fulfil the request, the resource requires attributes from an identity attribute service. In both scenarios, the principal is invoking a resource that needs identity information pertaining to the principal invoking the resource to process the request. The principal authentication may result in two tokens for the user, an authentication token which represents the completion of an authentication protocol and an identity token which may or may not contain additional information about the principal. Furthermore, the resource relies on the authentication service to perform the authentication.

Methods for performing such services according to embodiments of the present invention will now be discussed with reference to FIGS. 5-8. It should be noted that these methods can be implemented on a number of different systems such as those discussed above or other systems. It should also be noted that these exemplary embodiments are not intended to provide an all-inclusive description of the ways in which the systems described above. Rather, other methods of utilizing a directory enabler and/or profile enabler to dynamically provide identity management or other services are contemplated and considered to be within the scope of the present invention. Furthermore, these methods may be implemented in a number of different manners such as a browser based application, a web service, etc.

Figure 5:
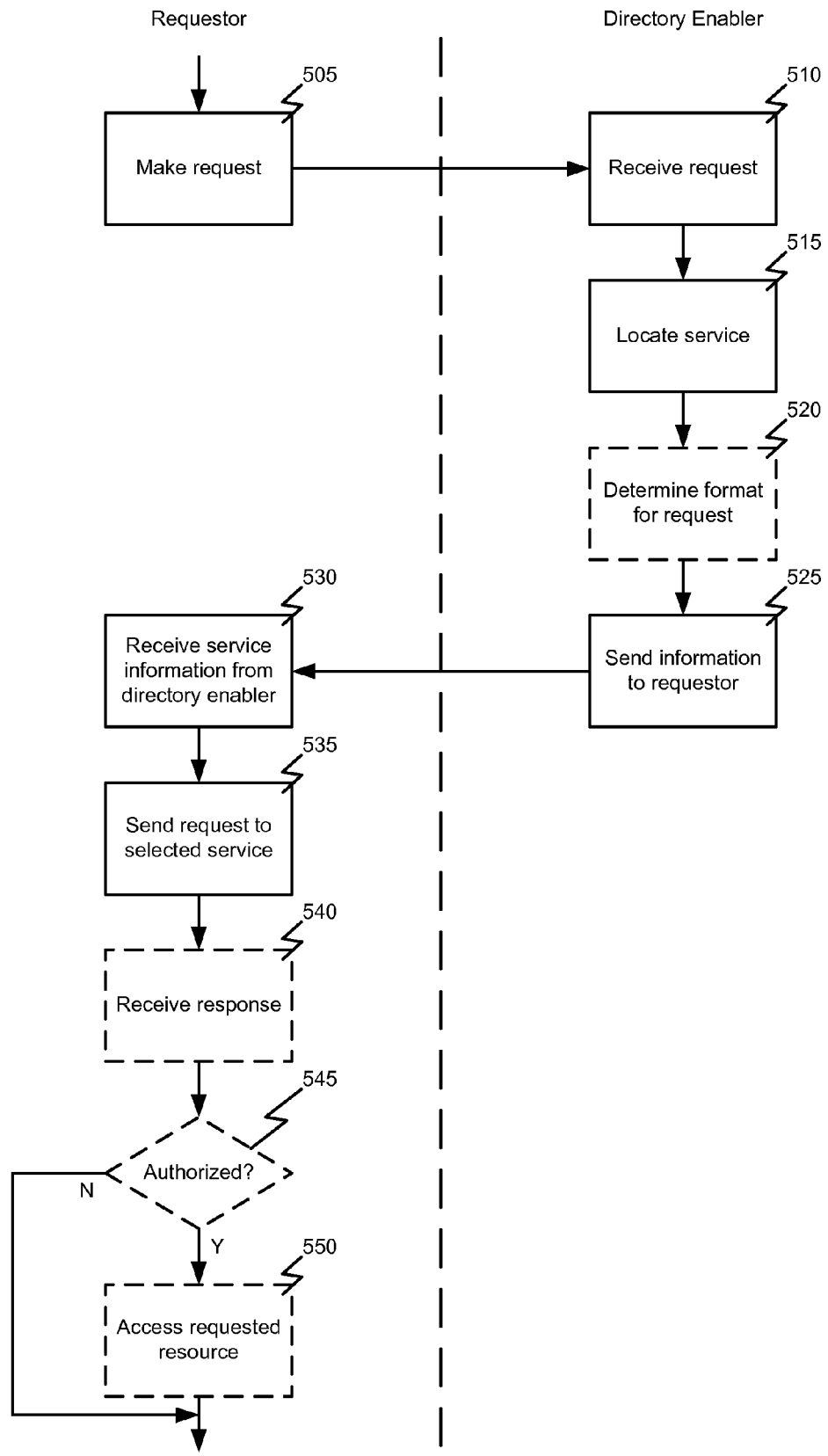
FIG. 5 is a flowchart illustrating a process for locating and providing an identity management service or accessing other principal related information or attributes according to one embodiment of the present invention.

FIG. 5 is a flowchart illustrating a process for locating and providing an identity management service or accessing other principal related information or attributes according to one embodiment of the present invention. This example illustrates the functions performed by a requestor and a directory enabler in the case where a profile enabler is not used. Examples of processes involving a profile enabler will be discussed below with reference to FIGS. 7 and 8.

In this example, the process begins when a requestor, such as a principal, a service, an application, etc. makes a request 505 to the directory enabler to locate a service to perform identity management or other services related to a principal. The requestor can make this request 505 in response to a need to determine something about a principal. For example, the requestor can receive a request from a principal's web browser, from a web service, etc. or may depending upon the implementation. Alternatively, the requestor's logic may need to determine some information about the principal such as obtaining some attributes, performing authentication, etc.

Once the requestor makes the request 505, the directory enabler receives 510 the request from the requestor and locates 515 a service to which the principal is known. As noted above, the directory enabler can include a data store that includes a list of or other information identifying services of which the directory enabler is aware. In such a case, the directory enabler can be adapted to select or locate 515 the service to which the principal is known from the list of services in the data store based on identity attributes provided by the principal. Alternatively, the directory enabler can be adapted to locate 515 the service to which the principal is known by querying the plurality of services and receiving a response from at least some of the plurality of services indicating whether the principal is known. In such a case, selecting 515 the service from the plurality of services can be based on the response from that service.

Optionally, the directory enabler can also determine 520 a format for the requesting services from the selected service. That is, different services may use different formats for requests. Information relating to the type of information, format, etc. may be maintained by the directory enabler, for example, as part of or separate from the data store maintaining information identifying the services. This information, as well as identity information supplied by the principal can be used to determine 520 a format acceptable to the selected service.

Once the directory enabler selects 515 an identity management service to which the principal is known and possibly determines 520 a format for a request to that service, the directory enabler can send 525 the information about the service to the requestor. The requestor in turn receives 530 the service information from the directory enabler and can send 535 a request to that service. For example, the requestor can request the selected service to perform some identity management service for the principal or perform some other function(s) that affect and/or report the principal.

Optionally, the requestor may receive 540, in response, a security token or other information related to the principal from the selected service. According to one embodiment, the requestor can then determine 545, based on the security token or other information, whether the principal is authorized to, for example, access a requested resource or perform a requested function. In response to determining 545 the principal is authorized, the requested resource can be accessed 550 or a requested function can be performed.

Figure 6:
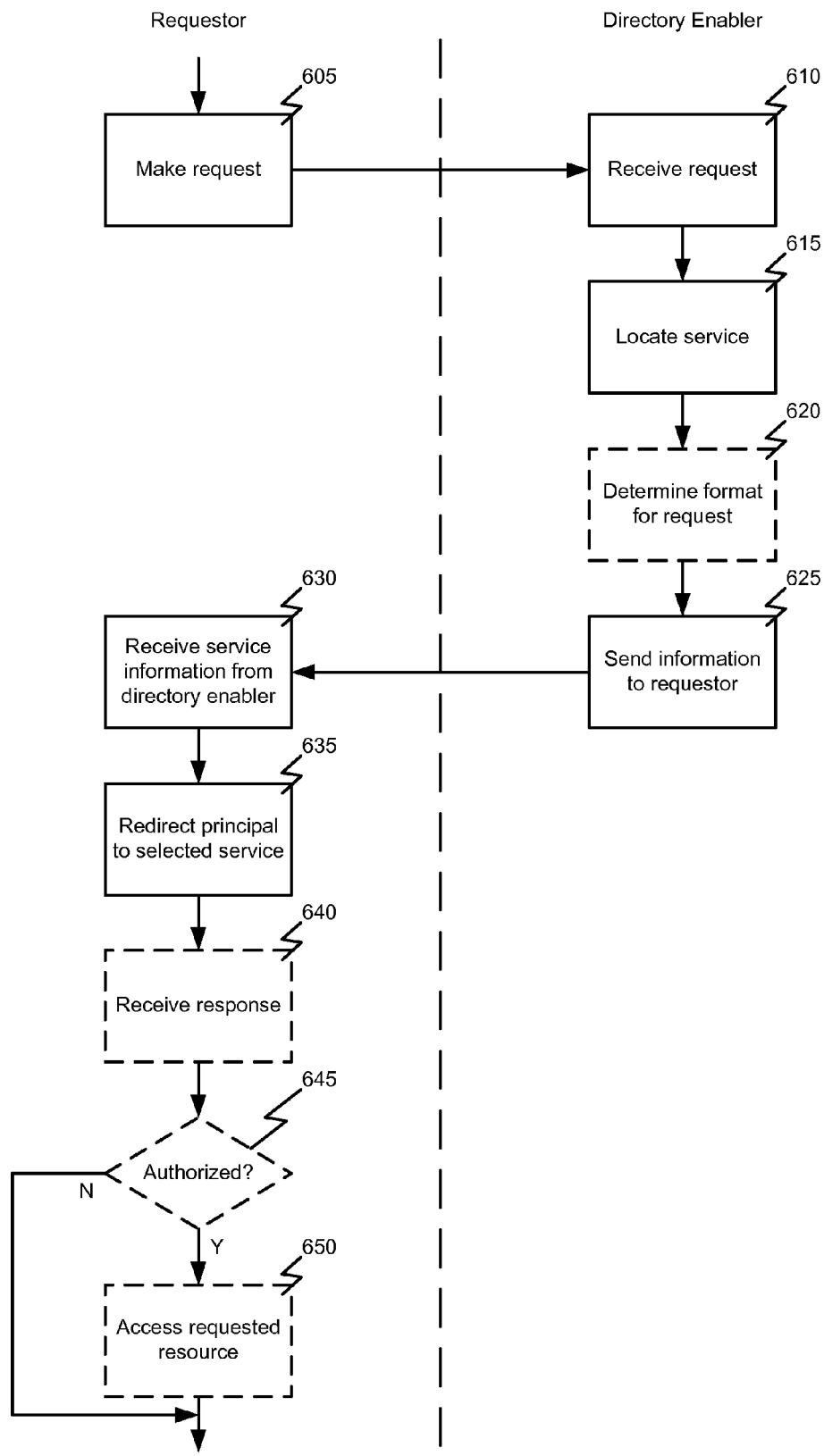
FIG. 6 is a flowchart illustrating a process for locating and providing an identity management service or accessing other principal related information or attributes according to an alternative embodiment of the present invention.

FIG. 6 is a flowchart illustrating a process for locating and providing an identity management service or accessing other principal related information or attributes according to an alternative embodiment of the present invention. This example illustrates the functions performed by a requestor and a directory enabler in the case where a profile enabler is not used and the principal or other entity is redirected to the selected service rather than the requestor contacting the selected service as described with reference to FIG. 5.

In this example, the process begins when a requestor, such as a principal, a service, an application, etc. makes a request 605 to the directory enabler to locate a service to perform identity management or other services related to a principal. The requestor can make this request 605 in response to a need to determine something about a principal. For example, the requestor can receive a request from a principal's web browser, from a web service, etc. or may depending upon the implementation. Alternatively, the requestor's logic may need to determine some information about the principal such as obtaining some attributes, performing authentication, etc.

Once the requestor makes the request 605, the directory enabler receives 610 the request from the requestor and locates 615 a service to which the principal is known. As noted above, the directory enabler can include a data store that includes a list of or other information identifying services of which the directory enabler is aware. In such a case, the directory enabler can be adapted to select or locate 615 the service to which the principal is known from the list of services in the data store based on identity attributes provided by the principal. Alternatively, the directory enabler can be adapted to locate 615 the service to which the principal is known by querying the plurality of services and receiving a response from at least some of the plurality of services indicating whether the principal is known. In such a case, selecting 615 the service from the plurality of services can be based on the response from that service.

Optionally, the directory enabler can also determine 620 a format for the requesting services from the selected service. That is, different services may use different formats for requests. Information relating to the type of information, format, etc. may be maintained by the directory enabler, for example, as part of or separate from the data store maintaining information identifying the services. This information, as well as identity information supplied by the principal can be used to determine 620 a format acceptable to the selected service.

Once the directory enabler selects 615 an identity management service to which the principal is known and possibly determines 620 a format for a request to that service, the directory enabler can send 625 the information about the service to the requestor. The requestor in turn receives 630 the service information from the directory enabler and can redirect 635 the principal or other entity to that service. For example, the requestor can redirect the principal or other entity to the selected service to perform some identity management service for the principal or perform some other function(s) that affect and/or report the principal.

Optionally, the requestor may receive 640, in response, a security token or other information related to the principal from the principal or other entity redirected to the selected service. According to one embodiment, the requestor can then determine 645, based on the security token or other information, whether the principal is authorized to, for example, access a requested resource or perform a requested function. In response to determining 645 the principal is authorized, the requested resource can be accessed 650 or a requested function can be performed.

Figure 7:
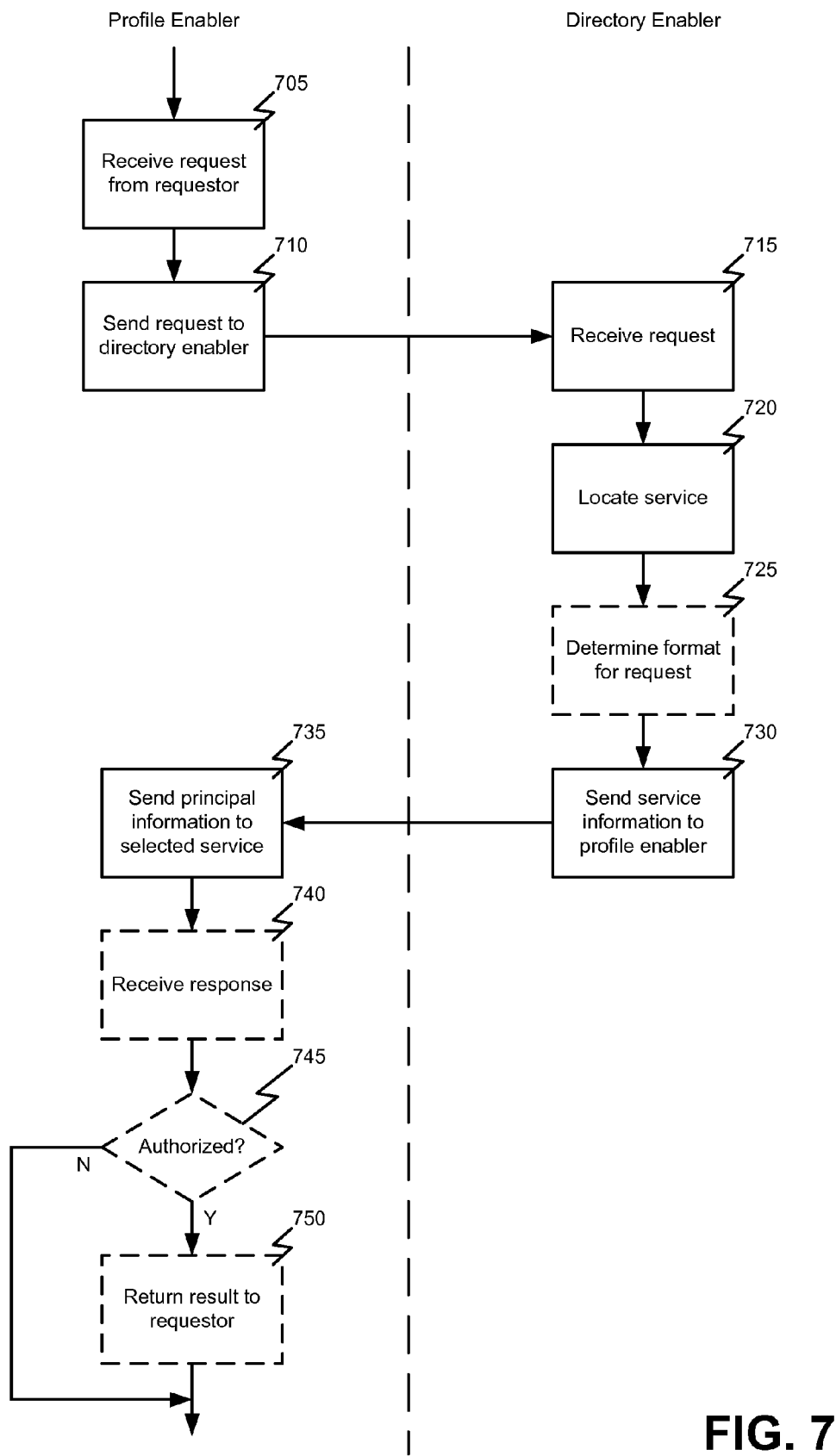
FIG. 7 is a flowchart illustrating a process for locating and providing an identity management service or accessing other principal related information or attributes using a profile enabler and a directory enabler according to yet another alternative embodiment of the present invention.

FIG. 7 is a flowchart illustrating a process for locating and providing an identity management service or accessing other principal related information or attributes using a profile enabler and a directory enabler according to yet another alternative embodiment of the present invention.

In this example, the process begins when a requestor, such as a principal, a service, an application, etc. makes a request to the profile enabler to locate a service to perform identity management or other services related to a principal. The profile enabler can in turn receive 705 the request and send 710 the request or information from the request, such as identity information related to the principal, to the directory enabler.

Once the profile enabler sends the request, the directory enabler receives 715 the request from the profile enabler and locates 720 a service to which the principal is known. As noted above, the directory enabler can include a data store that includes a list of or other information identifying services of which the directory enabler is aware. In such a case, the directory enabler can be adapted to select or locate 720 the service to which the principal is known from the list of services in the data store based on identity attributes provided by the principal. Alternatively, the directory enabler can be adapted to locate 720 the service to which the principal is known by querying the plurality of services, either directly or through the profile enabler, and receiving a response from at least some of the plurality of services indicating whether the principal is known. In such a case, selecting 720 the service from the plurality of services can be based on the response from that service.

Optionally, the directory enabler can also determine 725 a format for the requesting services from the selected service. That is, different services may use different formats for requests. Information relating to the type of information, format, etc. may be maintained by the directory enabler, for example, as part of or separate from the data store maintaining information identifying the services. This information, as well as identity information supplied by the principal can be used to determine 725 a format acceptable to the selected service.

Once the directory enabler selects 720 a service to which the principal is known and possibly determines 725 a format for a request to that service, the directory enabler can send 730 the information about the service to the profile enabler. The profile enabler in turn sends 735 a request or information about the principal to that service. For example, the profile enabler can request the selected service to perform some identity management service for the principal or perform some other function(s) that affect and/or report the principal.

Optionally, the profile enabler may receive 740, in response, a security token or other information related to the principal from the selected service. According to one embodiment, the profile enabler can then determine 745, based on the security token or other information, whether the principal is authorized to, for example, access a requested resource or perform a requested function. In response to determining 745 the principal is authorized, the profile enabler can return 750 a result to the requestor indicating that the requested resource can be accessed or a requested function can be performed.

Figure 8:
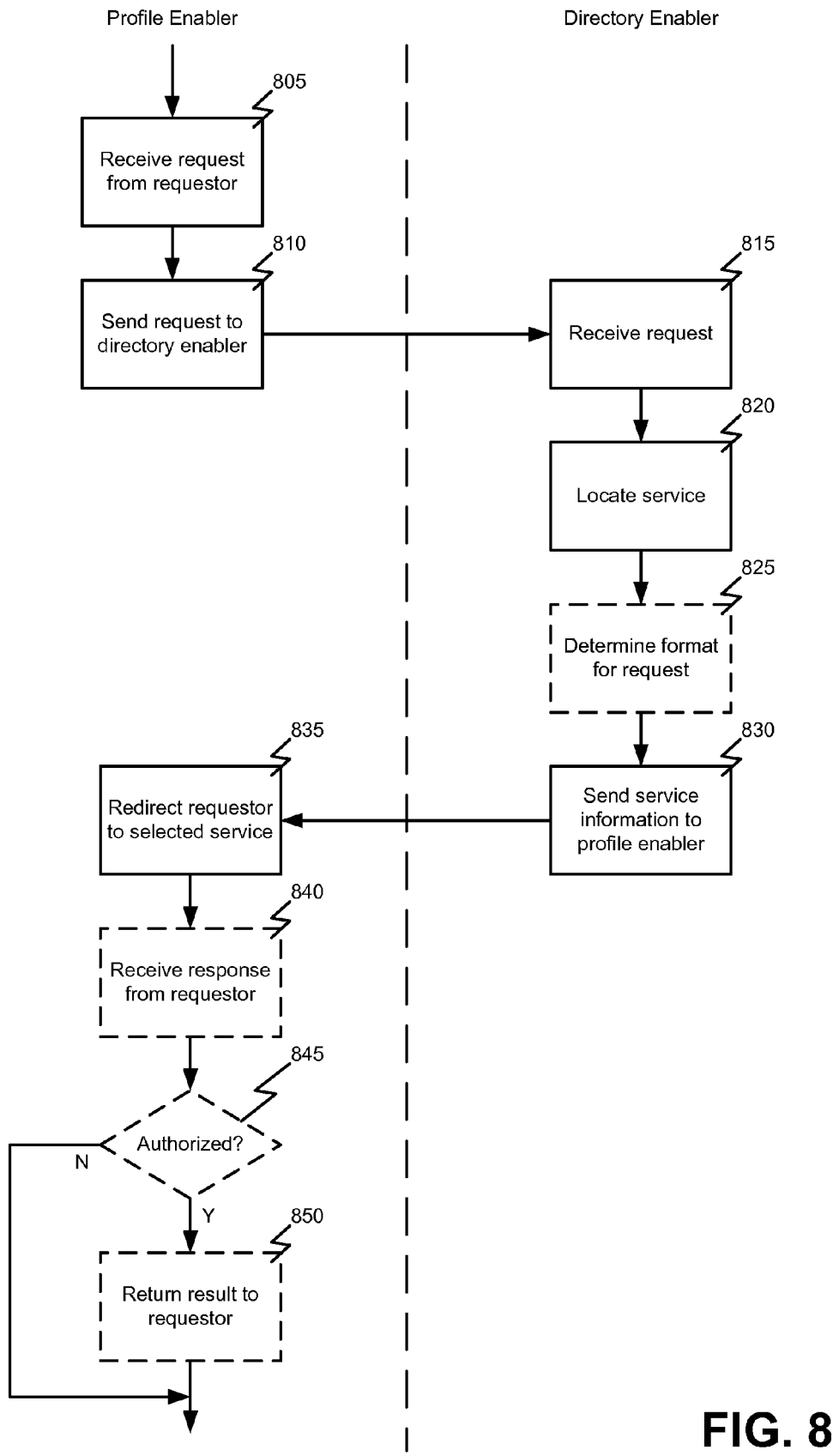
FIG. 8 is a flowchart illustrating a process for locating and providing an identity management service or accessing other principal related information or attributes using a profile enabler and a directory enabler according to still another alternative embodiment of the present invention.

FIG. 8 is a flowchart illustrating a process for locating and providing an identity management service or accessing other principal related information or attributes using a profile enabler and a directory enabler according to still another alternative embodiment of the present invention. This example illustrates the functions performed by a profile enabler and a directory enabler when the requestor is redirected to the selected service rather than the profile enabler contacting the selected service as described with reference to FIG. 7.

In this example, the process begins when a requestor, such as a principal, a service, an application, etc. makes a request to the profile enabler to locate a service to perform identity management or other services related to a principal. The profile enabler can in turn receive 805 the request and send 810 the request or information from the request, such as identity information related to the principal, to the directory enabler.

Once the profile enabler sends the request, the directory enabler receives 815 the request from the profile enabler and locates 820 a service to which the principal is known. As noted above, the directory enabler can include a data store that includes a list of or other information identifying services of which the directory enabler is aware. In such a case, the directory enabler can be adapted to select or locate 820 the service to which the principal is known from the list of services in the data store based on identity attributes provided by the principal. Alternatively, the directory enabler can be adapted to locate 820 the service to which the principal is known by querying the plurality of services, either directly or through the profile enabler, and receiving a response from at least some of the plurality of services indicating whether the principal is known. In such a case, selecting 820 the service from the plurality of services can be based on the response from that service.

Optionally, the directory enabler can also determine 825 a format for the requesting services from the selected service. That is, different services may use different formats for requests. Information relating to the type of information, format, etc. may be maintained by the directory enabler, for example, as part of or separate from the data store maintaining information identifying the services. This information, as well as identity information supplied by the principal can be used to determine 825 a format acceptable to the selected service.

Once the directory enabler selects 820 a service to which the principal is known and possibly determines 825 a format for a request to that service, the directory enabler can send 830 the information about the service to the profile enabler. The profile enabler in turn redirects 835 the requestor to that service. For example, the profile enabler can redirect the requestor to the selected service to perform some identity management service for the principal or perform some other function(s) that affect and/or report the principal.

Optionally, the profile enabler may receive 840, in response, a security token or other information related to the principal from the requestor. According to one embodiment, the profile enabler can then determine 845, based on the security token or other information, whether the principal is authorized to, for example, access a requested resource or perform a requested function. In response to determining 845 the principal is authorized, the profile enabler can return 850 a result to the requestor indicating that the requested resource can be accessed or a requested function can be performed.

Figure 9:
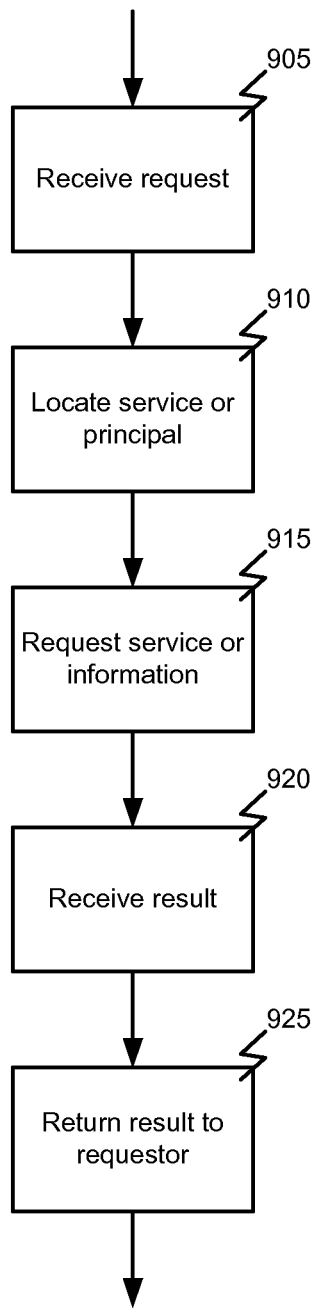
FIG. 9 is a flowchart illustrating a process for locating and providing an identity management service or accessing other principal related information or attributes using a profile enabler according to yet another alternative embodiment of the present invention.

FIG. 9 is a flowchart illustrating a process for locating and providing an identity management service or accessing other principal related information or attributes using a profile enabler according to yet another alternative embodiment of the present invention. In this example, the profile enabler can receive 905 a request from a principal, a service, or from another entity requesting, for example, identity management services related to or affecting the principal, to locate an identified principal, etc.

The profile enabler can then locate 910 a principal or service to which to delegate the task. That is, the profile enabler can select a service or identify another principal to which the principal identified by the request is known. As discussed above, the service or principal to which the principal is known can be located by the profile enabler and/or the directory enabler based on information provided by the requestor. For example, the request may include identity information related to the principal, a URI for the service or principal to be used, etc.

The profile enabler can then send 915 a request for the task to that principal or service, and can receive 920 a response indicating results of the task. For example, the results may indicate authentication of the principal, completion or failure of a requested identity management task, etc. The profile enabler can then return 925 the result or a status for the results to the requester.

In the foregoing description, for the purposes of illustration, methods were described in a particular order. It should be appreciated that in alternate embodiments, the methods may be performed in a different order than that described. It should also be appreciated that the methods described above may be performed by hardware components or may be embodied in sequences of machine-executable instructions, which may be used to cause a machine, such as a general-purpose or special-purpose processor or logic circuits programmed with the instructions to perform the methods. These machine-executable instructions may be stored on one or more machine readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

While illustrative and presently preferred embodiments of the invention have been described in detail herein, it is to be understood that the inventive concepts may be otherwise variously embodied and employed, and that the appended claims are intended to be construed to include such variations, except as limited by the prior art.

What is claimed is:

1. A method of providing a service related to an anonymous principal, the method comprising:
   receiving at a profile enabler from an entity other than the anonymous principal a request related to the anonymous principal, wherein an identity of the anonymous principal is unknown to the profile enabler and wherein the profile enabler cannot authenticate the anonymous principal;
   forwarding the request from the profile enabler to a directory enabler, wherein the profile enabler and the directory enabler are separate devices, each comprising at least one individual processor and memory and wherein the directory enabler also cannot authenticate the anonymous principal;
   receiving the request from the profile enabler at the directory enabler;
   selecting by the directory enabler a service to which the identity of the anonymous principal is known, the service selected from a plurality of different services, each of the plurality of different services separate from the profile enabler and the directory enabler, wherein selecting the service to which the identity of the anonymous principal is known is based on information from the request and information maintained by the directory enabler and identifying each of the plurality of different services and wherein selecting the service to which the identity of the anonymous principal is known comprises selecting the service from a list of services further based on one or more identity attributes related to the anonymous principal;
   sending information about the selected service from the directory enabler to the profile enabler;
   receiving the information about the selected service from the directory enabler at the profile enabler;
   requesting by the profile enabler an identity management result related to the anonymous principal from the selected service, wherein the identity management result is based on authentication of the anonymous principal by the selected service; and
   obtaining at the profile enabler an identity management result related to the anonymous principal from the selected service, wherein obtaining the identity management result related to the anonymous principal from the selected service comprises changing by the selected service an identity attribute related to the anonymous principal and wherein the service seeks approval from the principal prior to performing the changing of the identity attribute.

2. The method of claim 1, wherein selecting the service to which the identity of the anonymous principal is known is based on one or more identity attributes related to the anonymous principal.

3. The method of claim 2, wherein selecting the service to which the identity of the anonymous principal is known comprises selecting the service from a list of services based on the identity attributes related to the anonymous principal.

4. The method of claim 1, wherein selecting the service to which the identity of the anonymous principal is known is based on a Universal Resource Identifier (URI) provided by the anonymous principal.

5. The method of claim 1, wherein the identity attributes related to the anonymous principal are provided by the anonymous principal.

6. The method of claim 1, wherein obtaining the identity management result related to the anonymous principal from the selected service comprises obtaining a security token related to the anonymous principal.

7. The method of claim 6, further comprising determining with the profile enabler based on the security token whether the anonymous principal is authorized to access a requested resource and, in response to determining the anonymous principal is authorized, accessing the requested resource.

8. The method of claim 1, wherein obtaining the identity management result related to the anonymous principal from the selected service comprises obtaining from the selected service an identity attribute related to the anonymous principal.

9. The method of claim 1, wherein obtaining the identity management result related to the anonymous principal from the selected service comprises obtaining from the selected service an indication of the anonymous principal being authenticated.

10. The method of claim 1, wherein obtaining the identity management result related to the anonymous principal from the selected service comprises affecting the anonymous principal by the selected service.

11. The method of claim 1, wherein obtaining the identity management result related to the anonymous principal from the selected service comprises redirecting the anonymous principal to the selected service.

12. The method of claim 11, further comprising receiving a security token at the profile enabler from the anonymous principal, determining with the profile enabler based on the security token whether the anonymous principal is authorized to access the requested resource, and in response to determining the anonymous principal is authorized, accessing the requested resource from the profile enabler.

13. The method of claim 1, further comprising, prior to obtaining the identity management result related to the anonymous principal from the selected service, requesting permission by the profile enabler from the anonymous principal to affect the identity management result and wherein obtaining the identity management result further comprises obtaining the identity management result only if the anonymous principal grants permission.

14. A system comprising:
a plurality of services affecting an identity management result;
a profile enabler communicatively coupled with one or more of the services and receiving a request from and related to an anonymous principal, wherein the request is received from an entity other than the anonymous principal, wherein the anonymous principal is unknown to the profile enabler and wherein the profile enabler cannot authenticate the anonymous principal; and
a directory enabler communicatively coupled with the profile enabler, wherein the profile enabler and the directory enabler are separate devices, each comprising at least one individual processor and memory and wherein the directory enabler also cannot authenticate the anonymous principal, wherein the profile enabler forwards the request to the directory enabler, wherein the directory enabler receives the request from the profile enabler, selects a service to which the identity of the anonymous principal is known from the plurality of services based on one or more identity attributes related to the anonymous principal, and sends information about the selected service to the profile enabler, wherein selecting the service to which the identity of the anonymous principal is known is based on information from the request and information maintained by the directory enabler and identifying each of the plurality of services and wherein selecting the service to which the identity of the anonymous principal is known comprises selecting the service from a list of services further, wherein the profile enabler obtains an identity management result related to the anonymous principal from the selected service, wherein obtaining the identity management result related to the anonymous principal from the selected service comprises changing by the selected service an identity attribute related to the anonymous principal and wherein the service seeks approval from the principal prior to performing the changing of the identity attribute.

15. The system of claim 14, wherein the directory enabler selects the service to which the anonymous principal is known based on one or more identity attributes related to the anonymous principal.

16. The system of claim 15, wherein the identity attributes related to the anonymous principal are provided by the anonymous principal.

17. The system of claim 14, wherein the profile enabler obtains the identity management result related to the anonymous principal from the service to which the identity of the anonymous principal is known by obtaining a security token related to the anonymous principal.

18. The system of claim 17, wherein the profile enabler further determines based on the security token whether the anonymous principal is authorized to access a requested resource.

19. The system of claim 14, wherein the profile enabler obtains the identity management result related to the anonymous principal from the selected service by obtaining from the selected service an identity attribute related to the anonymous principal.

20. The system of claim 14, wherein the profile enabler obtains the identity management result related to the anonymous principal from the selected service by requesting the selected service to change an identity attribute related to the anonymous principal.

21. The system of claim 14, wherein the profile enabler obtains the identity management result related to the anonymous principal from the selected service by requesting the selected service to affect the anonymous principal.

22. The system of claim 14, wherein the profile enabler obtains the identity management result related to the anonymous principal from the service by redirecting the anonymous principal to the selected service.

23. The system of claim 22, wherein the profile enabler is further adapted to receive the security token from the anonymous principal and determine based on the security token whether the anonymous principal is authorized to access a requested resource.

* * * * *